(12) United States Patent
Kim

(10) Patent No.: US 12,551,175 B2
(45) Date of Patent: Feb. 17, 2026

(54) HEAD POSITIONING STANDARDIZATION METHOD

(71) Applicant: Han-Joon Kim, Hyogo (JP)

(72) Inventor: Han-Joon Kim, Hyogo (JP)

( * ) Notice: Subject to any disclaimer, the term of this patent is extended or adjusted under 35 U.S.C. 154(b) by 421 days.

(21) Appl. No.: 18/024,945

(22) PCT Filed: Sep. 9, 2021

(86) PCT No.: PCT/JP2021/033177
§ 371 (c)(1),
(2) Date: Mar. 6, 2023

(87) PCT Pub. No.: WO2022/054875
PCT Pub. Date: Mar. 17, 2022

(65) Prior Publication Data
US 2023/0329654 A1    Oct. 19, 2023

(30) Foreign Application Priority Data

Sep. 9, 2020    (JP) ................. 2020-151642

(51) Int. Cl.
*A61B 6/04*    (2006.01)
*A61B 6/50*    (2024.01)
*G06V 10/46*    (2022.01)

(52) U.S. Cl.
CPC ............ *A61B 6/0492* (2013.01); *A61B 6/501* (2013.01); *G06V 10/46* (2022.01)

(58) Field of Classification Search
CPC ..... A61B 5/0035; A61B 5/0077; A61B 6/035; A61B 6/0492; A61B 6/4435; A61B 6/501; A61B 6/51
See application file for complete search history.

(56) References Cited

U.S. PATENT DOCUMENTS

2002/0041652 A1*  4/2002  Suuronen ............... A61B 6/501
                                                378/208
2003/0225325 A1*  12/2003  Kagermeier ......... A61N 5/1049
                                                600/407
(Continued)

FOREIGN PATENT DOCUMENTS

JP    2002-159491    6/2002
JP    2002-360565    12/2002
(Continued)

OTHER PUBLICATIONS

International Preliminary Report on Patentability—Notification from International Bureau—PCT/IB326 (and attachments).
(Continued)

*Primary Examiner* — David J Makiya
*Assistant Examiner* — Soorena Kefayati
(74) *Attorney, Agent, or Firm* — Smith, Gambrell & Russell, LLP

(57) ABSTRACT

A method of positioning a patient's head includes a profile positioning step and a front positioning step. In the profile positioning step, the vertical position of a first camera is adjusted and the patient is instructed to adjust the forward-backward position of their head so a point of intersection of a first vertical reference line and a first horizontal reference line is in the center of the patient's ear canal In the front positioning step, the vertical position of a second camera is adjusted so a second horizontal reference line passes through the center of the patient's left and right eyeballs and the patient is instructed to adjust the left-right inclination of their head so heights of the left and right eyes are equal, and to adjust the left-right orientation of their head so a second vertical reference line passes through the center of the left and right eyes.

10 Claims, 13 Drawing Sheets

(56) References Cited

U.S. PATENT DOCUMENTS

| | | | | |
|---|---|---|---|---|
| 2009/0310741 | A1* | 12/2009 | Borghese | A61B 6/544 378/38 |
| 2011/0064188 | A1* | 3/2011 | Suzuki | A61B 6/51 378/62 |
| 2011/0129058 | A1* | 6/2011 | Ulrici | A61B 6/51 378/38 |
| 2013/0163718 | A1* | 6/2013 | Lindenberg | A61B 6/5235 378/39 |
| 2018/0055463 | A1* | 3/2018 | Fuh | A61B 6/4435 |
| 2019/0357861 | A1* | 11/2019 | Varlet | A61B 5/1077 |
| 2020/0085387 | A1* | 3/2020 | Nyholm | A61B 6/032 |
| 2020/0261038 | A1* | 8/2020 | Loustauneau | A61B 6/4085 |
| 2020/0261039 | A1* | 8/2020 | Varlet | A61B 6/4085 |

FOREIGN PATENT DOCUMENTS

| | | |
|---|---|---|
| JP | 2003-319930 | 11/2003 |
| JP | 2008-161234 | 7/2008 |
| JP | 2013-48740 | 3/2013 |
| JP | 2020-513896 | 5/2020 |

OTHER PUBLICATIONS

English Translation of the International Preliminary Report on Patentability—Notification from International Bureau—PCT/IB338 (and attachments).
"Tobu X-sen Kikaku Satsueiho"(Cephalometric Radiography Method); Jan. 12, 1999; available at (http://rada.or.jp/database/home4/normal/ht-docs/member/synopsis/030084.html).

* cited by examiner

FIG. 17
(A)
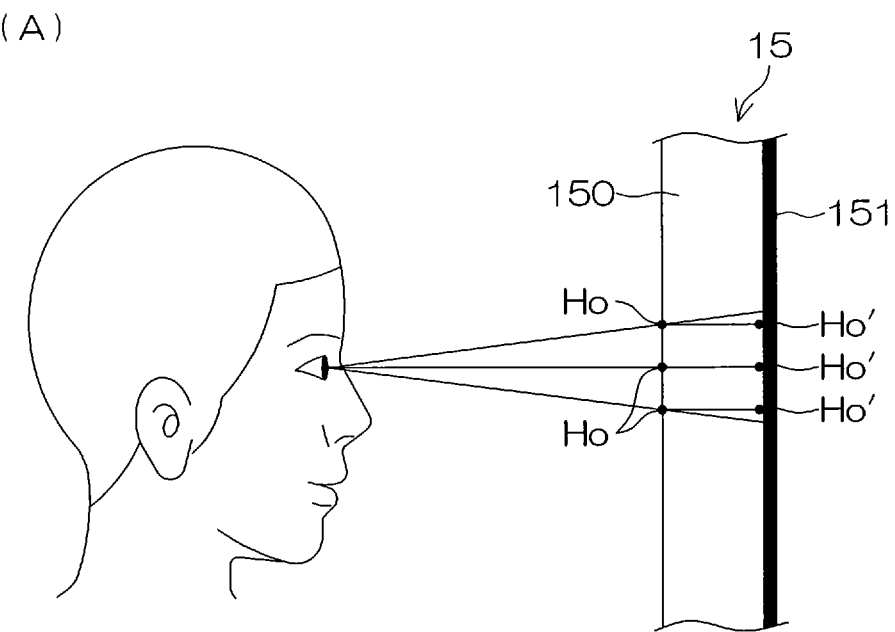
(B)
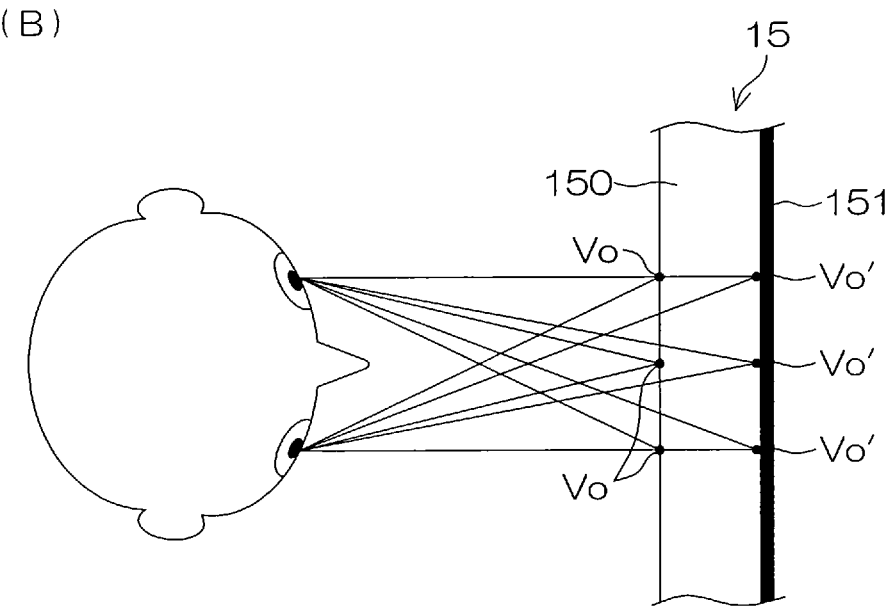

HEAD POSITIONING STANDARDIZATION METHOD

TECHNICAL FIELD

The present invention relates to a head positioning standardization method in performing a head standard radiography.

BACKGROUND ART

X-ray radiographic information of the craniofacial skeleton is essential in medical fields, especially in quantitative morphologic diagnosis of the maxillofacial region, that is, accurate morphologic evaluation before and after treatment in orthodontic treatment for achieving harmony of positional relationship of dentition and maxillofacial skeleton, surgical orthodontic treatment for surgically improving distortion, malformation, etc., of the maxillofacial region, cosmetic surgery treatment, or plastic surgery treatment, etc.

Also, unlike in qualitative diagnosis by which the presence/non-presence of a lesion is diagnosed, in quantitative morphometric diagnosis by which morphologic features and changes are diagnosed, the clinical grounds and reproducibility of orientations of the maxillofacial region to be measured and evaluated, that is, diagnostic orientations of the front face and the right and left faces, etc., to be standardized are extremely important to the degree of influencing the evaluation and diagnostic contents.

With images taken by plain X-ray radiography using an ordinary X-ray radiography apparatus, the orientation and size of the taken image change each time an image is taken and are not fixed. Therefore, even when a taken skeletal morphology image of the interior of the maxillofacial region that cannot be seen by the naked eye is obtained, it is difficult to quantitatively evaluate features and changes over time before and after treatment, etc., and the like of the maxillofacial skeleton.

In around 1940, 40 years after the invention of the medical X-ray radiography apparatus, the cephalometric image-taking method of taking images with the head position being standardized at a fixed distance and fixed orientation and a cephalometric radiography apparatus for this method were devised and for the first time, quantitative morphologic diagnosis of the maxillofacial region became possible and since then, cephalograms have come to be used frequently as major diagnostic materials of maxillofacial cranial morphology.

With cephalograms taken by the cephalometric radiography apparatus, there is an issue that due to standardization errors of the head position, subtle changes in position and orientation with respect to an irradiating port occur each time an image is taken such as to influence the projected image morphology and distort and destabilize the size and shape of the morphology.

With a conventional cephalometric radiography apparatus, standardized image taking of the head is performed upon inserting ear rods (positioning apparatus) into the right and left ear holes (external auditory canals) of a patient to position the patient's head position (see Non-Patent Literature 1). Since being conceived in 1940, all cephalometric radiography apparatuses are in accordance with the cephalometric image-taking method using the ear rods and there has yet to be an apparatus that is in accordance with a cephalometric image-taking method other than the above.

CITATION LIST

Non-Patent Literature

Non-Patent Literature 1: "Tobu X-sen Kikaku Satsueiho" (Cephalometric Radiography Method) (http://rada.or.jp/database/home4/normal/ht-docs/member/synopsis/030084.html)

SUMMARY OF INVENTION

Technical Problem

With the existing cephalometric radiography method, cephalometric standardization is performed just by using ear rods. It is therefore difficult to keep play arising from differences in size and morphology of the ear rods and external auditory canals and rotational displacement of the head position in an up/down direction with the ear rods as a center under complete control and a limit of cephalometric standardization precision due to the ear rods is a problem.

Also, lateral cephalograms are applied not just simply to evaluation and diagnosis of morphological features and changes of the maxillofacial skeleton but also to evaluation and diagnosis of positional relationships and relevancy between morphological features of maxillofacial bones and the respiratory tract, tongue position, cervical vertebrae and other neighboring mobile organs in a periphery of the maxillofacial skeleton. The shape of the respiratory tract and the position of the tongue that are taken are also influenced by the positional relationship of the posture and head position, that is, the relationship of the cervical vertebrae and head position of the patient during image taking. A novel positioning standardization method that involves not just the head position but integrally involves the head position and the entire body is thus being demanded.

The present invention proposes a head positioning standardization method that is improved in clinical grounds and reproducibility.

Also, the present invention provides a positioning standardization method of the head position in a state where a positional relationship of the head position and posture is maintained, that is, in a posture that is high in clinical grounds and reproducibility.

Also, a main object is to achieve, by adoption of the head positioning standardization method according to the present invention, improvement of clinical utility of taken head image materials themselves that are obtained through subsequent use of an X-ray radiography apparatus (cephalometric radiography apparatus, head X-ray CT image-taking apparatus, etc.) and improvement of precision of maxillofacial morphologic diagnosis and treatment.

Solution to Problem

The present invention has been made to achieve the above objects and the invention according to claim 1 is a head positioning standardization method for cephalometric radiography and is a head positioning standardization method including a lateral positioning step of using a first digital camera with which a camera optical axis is positioned on the same straight line as an X-ray radiography axis for image taking, from a lateral side, the head of a patient disposed in an image-taking space to perform imaging of the lateral side of the head of the patient and displaying a first horizontal reference line and a first vertical reference line, which are determined by the camera optical axis of the first digital camera, together with the imaged lateral head image of the patient on a first monitor and a frontal positioning step of using a second digital camera having a horizontal camera optical axis forming an angle of 90° with the camera optical axis of the first digital camera in plan view and directed toward a facial side of the head of the patient disposed in the image-taking space to perform imaging of the facial side of the head of the patient and displaying a second horizontal reference line and a second vertical reference line, which are determined by the camera optical axis of the second digital camera, together with the imaged facial head image of the patient on a second monitor, where, in the lateral positioning step, while viewing the display on the first monitor, the X-ray radiography axis and an up/down position of the first digital camera are adjusted and the patient is instructed to adjust a front/rear position of the head such that an intersection of the first horizontal reference line and the first vertical reference line that corresponds to the camera optical axis of the first digital camera is set at an external auditory canal center of the patient and, in the frontal positioning step, while viewing the display on the second monitor, an up/down position of the second digital camera is adjusted and the patient is instructed to adjust a tilt in a right/left direction of the facial side of the head to equalize heights of the right and left eyes such that the second horizontal reference line passes through centers of the right and left eyeballs and the patient is also instructed to adjust an orientation in the right/left direction of the facial side of the head such that the second vertical reference line passes through a middle between the right and left eyes of the patient, and including a recording step in which, after the respective adjustments in the lateral positioning step and the frontal positioning step are ended and head positioning is ended, shutters of the first digital camera and the second digital camera are released to record a lateral head image in association with the first horizontal reference line and the first vertical reference line and a facial head image in association with the second horizontal reference line and the second vertical reference line and height positions of the first digital camera and the second digital camera are recorded.

The invention according to claim 2 is a cephalometric radiography method characterized in that, after the recording step described in claim 1 is ended, the first digital camera is withdrawn from being on the X-ray radiography axis and X-ray irradiation is performed.

The invention according to claim 3 is a head positioning standardization method for head X-ray CT and is a head positioning standardization method including a lateral positioning step of using a first digital camera having a horizontal camera optical axis directed toward a lateral side of the head of a patient disposed in an image-taking space to perform imaging of the lateral side of the head of the patient and displaying a first horizontal reference line and a first vertical reference line, which are determined by the camera optical axis of the first digital camera, together with the imaged lateral head image of the patient on a first monitor and a frontal positioning step of displaying, on a second monitor, a second horizontal reference line and a second vertical reference line, which are determined by a horizontal camera optical axis forming an angle of 90° with the camera optical axis of the first digital camera in plan view and directed toward a facial side of the head of the patient disposed in the image-taking space, together with an imaged facial head image of the patient, where, in the lateral positioning step, while viewing the display on the first monitor, an up/down position of the first digital camera is adjusted and the patient is instructed to adjust a front/rear position of the head such that an intersection of the first horizontal reference line and the first vertical reference line that corresponds to the camera optical axis of the first digital camera is set at an external auditory canal center of the patient and, in the frontal positioning step, while viewing the display on the second monitor, an up/down position of a second digital camera is adjusted and the patient is instructed to adjust a tilt in a right/left direction of the facial side of the head to equalize heights of the right and left eyes such that the second horizontal reference line passes through centers of the right and left eyeballs and the patient is also instructed to adjust an orientation in the right/left direction of the facial side of the head such that the second vertical reference line passes through a middle between the right and left eyes of the patient, and including a recording step in which, after the respective adjustments in the lateral positioning step and the frontal positioning step are ended and head positioning is ended, shutters of the first digital camera and the second digital camera are released to record a lateral head image in association with the first horizontal reference line and the first vertical reference line and a facial head image in association with the second horizontal reference line and the second vertical reference line and height positions of the first digital camera and the second digital camera are recorded.

The invention according to claim 4 is the head positioning standardization method according to claim 1 or 3, where, in head positioning that is performed again on the same patient, in the lateral positioning step, a height of the first digital camera is set at the height position recorded in the previous positioning, a lateral head image of the patient imaged with the first digital camera, the first horizontal reference line, and the first vertical reference line are displayed on the first monitor, and the previously recorded lateral head image, first horizontal reference line, and first vertical reference line are read and displayed overlappingly on the display on the first monitor, and the patient is instructed to adjust the front/rear position of the head such that the intersection of the first horizontal reference line and the first vertical reference line that corresponds to the camera optical axis of the first digital camera is set at the external auditory canal center of the patient and overlapping of contours is achieved with respect to the previous image and, in the frontal positioning step, a height of the second digital camera is set at the height position recorded in the previous positioning, a facial head image of the patient imaged with the second digital camera, the second horizontal reference line, and the second vertical reference line are displayed on the second monitor, and the previously recorded facial head image, second horizontal reference line, and second vertical reference line are read out and displayed overlappingly on the display on the second monitor, and the patient is instructed to equalize heights of the right and left eyes, adjust the orientation in the right/left direction of the facial side of the head, and adjust such that overlapping of contours is achieved with respect to the previous image.

The invention according to claim 5 is the head positioning standardization method according to claim 4 including a recording step in which, after the respective adjustments in the lateral positioning step and the frontal positioning step are ended and head positioning is ended, shutters of the first digital camera and the second digital camera are released to record a lateral head image in association with the first horizontal reference line and the first vertical reference line and a facial head image in association with the second horizontal reference line and the second vertical reference line and height positions of the first digital camera and the second digital camera are recorded.

Advantageous Effects of Invention

By the present invention, the patient's head position can be positioned and standardized in high precision by the head position images obtained by the two digital cameras having the lens optical axes that are orthogonal in plan view and the horizontal reference lines and the vertical reference lines that are based on the lens optical axes.

BRIEF DESCRIPTION OF DRAWINGS

FIGS. 17(A) and (B) are illustrative views for describing actions of the one-way mirror 15.

DESCRIPTION OF EMBODIMENTS

Preferred Embodiments of the Present Invention shall now be described specifically with reference to the drawings.

First Preferred Embodiment

Figure 1:
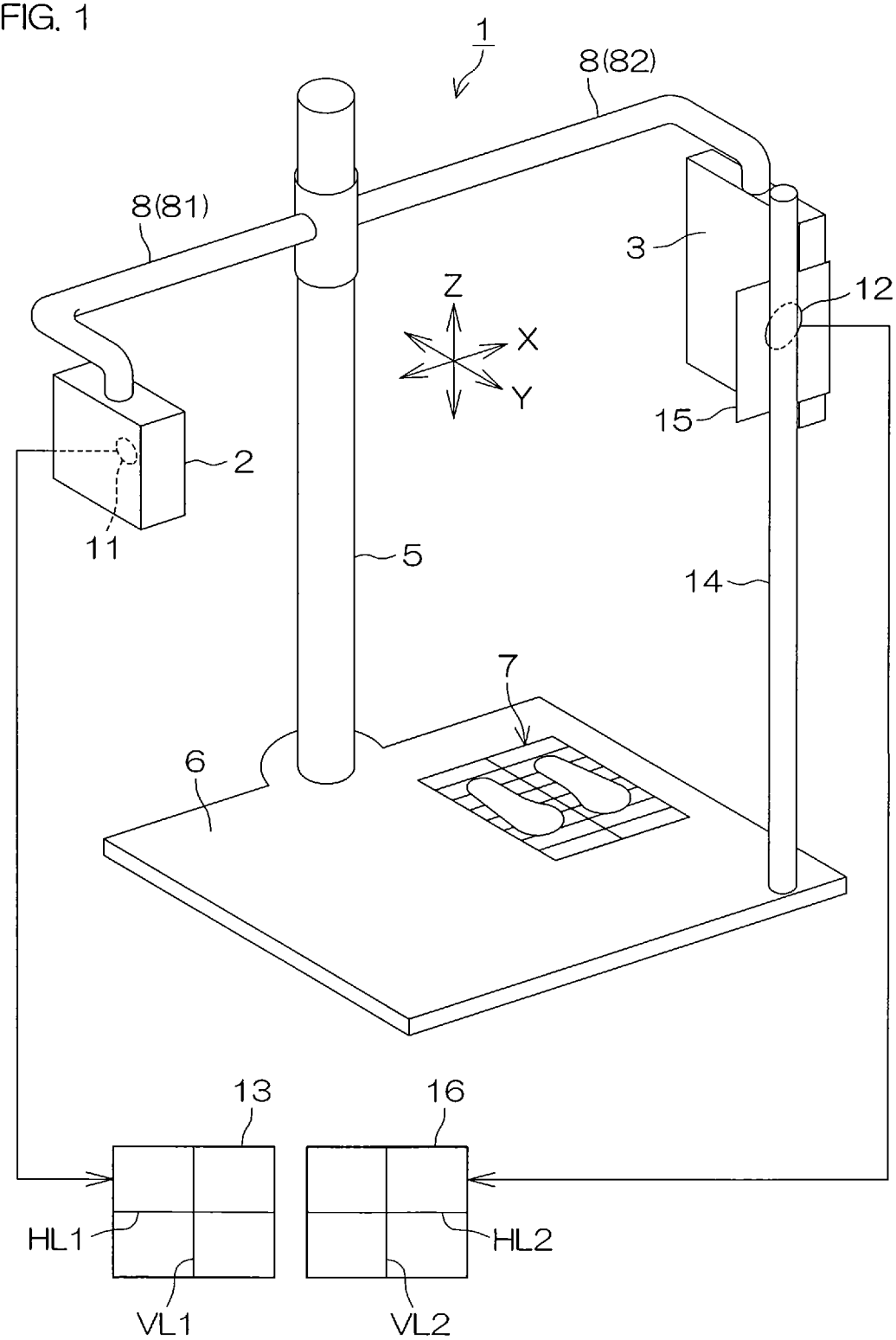
FIG. 1 is a perspective view showing an arrangement schematic of a state in which a head positioning standardization apparatus according to a preferred embodiment of the present invention is incorporated in a cephalometric radiography apparatus.
Figure 2:
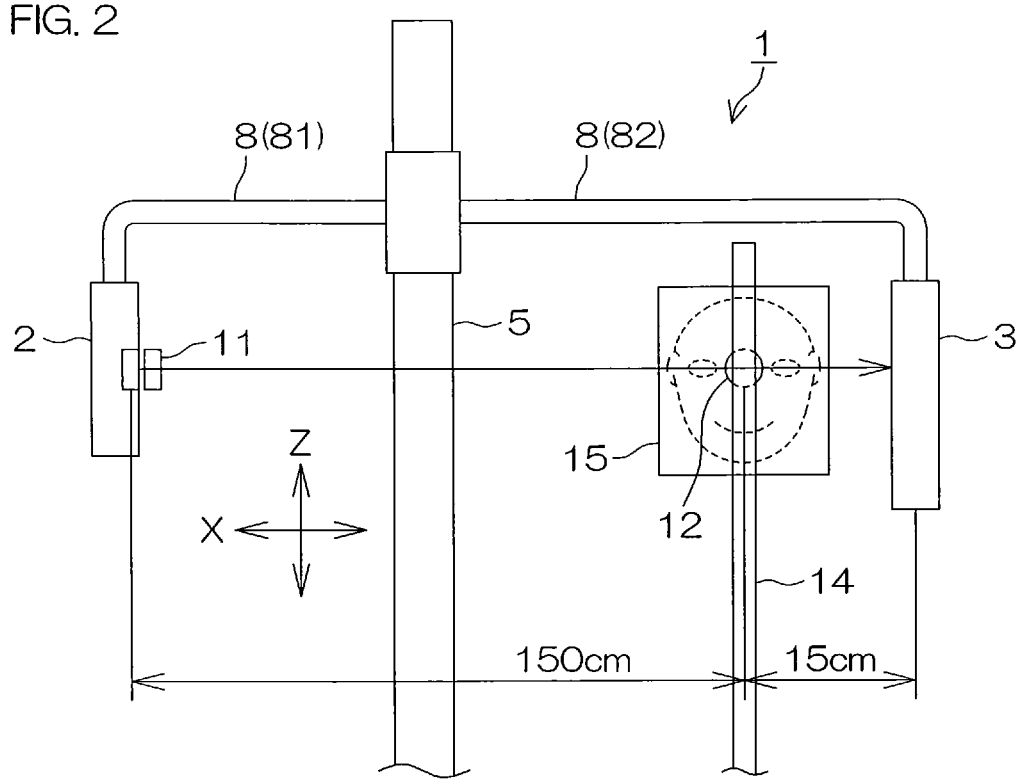
FIG. 2 is a front view showing an arrangement schematic of the cephalometric radiography apparatus incorporating the head positioning standardization apparatus shown in FIG. 1.
Figure 3:
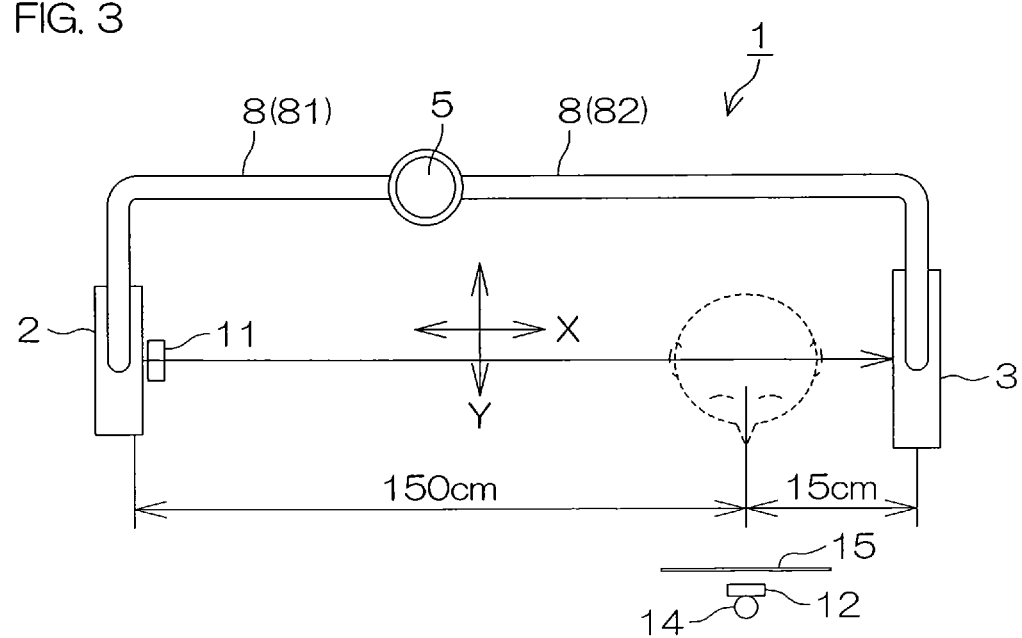
FIG. 3 is a plan view showing the arrangement schematic of the cephalometric radiography apparatus incorporating the head positioning standardization apparatus shown in FIG. 1.

FIG. 1 is a perspective view showing an arrangement schematic of a state in which a head positioning standardization apparatus according to a preferred embodiment of the present invention is incorporated in a cephalometric radiography apparatus. Also, FIG. 2 is a front view showing an arrangement schematic of the cephalometric radiography apparatus incorporating the head positioning standardization apparatus shown in FIG. 1 and FIG. 3 is a plan view showing the arrangement schematic of the cephalometric radiography apparatus incorporating the head positioning standardization apparatus shown in FIG. 1. In regard to description of directions in FIGS. 1 to 3, a right/left direction shall be referred to as an X direction, a front/rear direction shall be referred to as a Y direction, and an up/down direction shall be referred to as a Z direction in the following.

Referring to FIGS. 1 to 3, a cephalometric radiography apparatus 1 includes an X-ray irradiating portion 2 and an X-ray detecting portion 3. Also, a distance between the X-ray irradiating portion 2 and the X-ray detecting portion 3 is set to 165 cm in the X direction and design is made such that the head center of a patient (median plane of the patient) is positioned at a position 15 cm in front of the X-ray detecting portion 3 as seen in the X direction from the X-ray irradiating portion 2. This is a universal cephalometric radiography standard.

Ear rods have been used from before to position the head of the patient. The ear rods are fixation devices for positioning the head center of the patient at the 15 cm in front of the X-ray detecting portion 3 as seen in the X direction.

With a conventional method, the three-dimensional head position is fixed and positioned by the ear rods and visual observation by an operator, that is, a three-dimensional object is directly fixed and positioned using a three-dimensional means. In other words, right and left ear rods are inserted into the right and left external auditory canals of the patient's head such as to sandwich it and fix it close to a middle between the ear rods and an up/down orientation of the head position is positioned with the sandwiching ear rods as a center. Therefore, at the point of being sandwiched by the ear rods, an orientation of the face is substantially determined by the contact positions and states inside the right and left external auditory canals and the remaining orientation in the up/down direction (with the ear rods as the center) is determined by the visual observation by the operator. The visual observation by the operator in this process is made at the viewpoint position of the operator and the direction thereof changes each time an image is taken and is not fixed. Also, positional relationships of the ear rods inserted inside the external auditory canals and the external auditory canals cannot be observed visually. Therefore, even though an X-ray radiography axis is standardized about the ear rods, it is difficult to position the ear rods accurately at a center of the external auditory canals. Also, positioning by visual observation of the orientation of the face in accordance with an image-taking orientation is also insufficient in terms of precision. Such errors in head positioning, standardization, and reproduction thereof that occur each time an image is taken thus present a fundamental problem in terms of achieving improvements in precision and reliability of maxillofacial morphologic diagnosis.

Also, since the positioning by the ear rods is of a concept of fixing the three-dimensional shape of a human body structure that is not standardized by a single three-dimensional shape that is standardized, three-dimensional plays obviously arise therebetween and even if it is firmly sandwiched by the right and left ear rods, since tightening is performed not just from one side but from both sides, it is strongly sandwiched at two right and left point positions of contacts made by chance and is merely made immovable by pain, and thus three-dimensional differences in shape and plays between the right and left ear rods and the external auditory canals are not necessarily corrected for but rather, the head position and posture are merely distorted. Since it is rare for the structure called the human face to be of position and shape that are right/left symmetrical and furthermore, the interiors of the external auditory canals are covered by soft tissue, have elasticity, and have the sense of feeling pain, there is a limit to positional precision achieved by the ear rods.

Three-dimensional plays between contact-fixed portions that cannot be counteracted thus arise with the fixing method using the ear rods that attempts to fix an actual head three-dimensionally. There is also a limit to correcting the plays by adjustment of a three-dimensional orientation of the head position by the visual observation by the operator that is unstable and can only be made from a single direction at a time.

With this preferred embodiment, positioning standardization of the patient's head is performed using two digital cameras, namely, a first digital camera 11 and a second digital camera 12 in place of the ear rods.

The first digital camera 11 is disposed such that a camera optical axis is positioned on the same straight line as the X-ray radiography axis irradiated from the X-ray irradiating portion 2. Specifically, the first digital camera 11 is mounted to a housing of the X-ray irradiating portion 2 and the optical axis of the lens is disposed such as to extend on the same straight line as the X-ray radiography axis irradiated from the X-ray irradiating portion 2. The X-ray radiography axis is an axis line that passes through the external auditory canal center of the patient from the X-ray irradiating portion 2 and extends horizontally in the X direction toward the X-ray detecting portion 3. The first digital camera 11 is disposed such that the optical axis of the lens is the same axial line as the X-ray radiography axis. Also, since the first digital camera 11 is mounted to the housing of the X-ray irradiating portion 2, when the X-ray irradiating portion 2 is moved vertically up/down in the Z direction along a support column 5, the first digital camera 11 is also moved vertically up/down in the Z direction. In other words, the X-ray radiography axis irradiated from the X-ray irradiating portion 2 and the optical axis of the first digital camera 11 are always positioned on the same axial line regardless of height positions of the X-ray irradiating portion 2 and the first digital camera 11.

Figure 4:
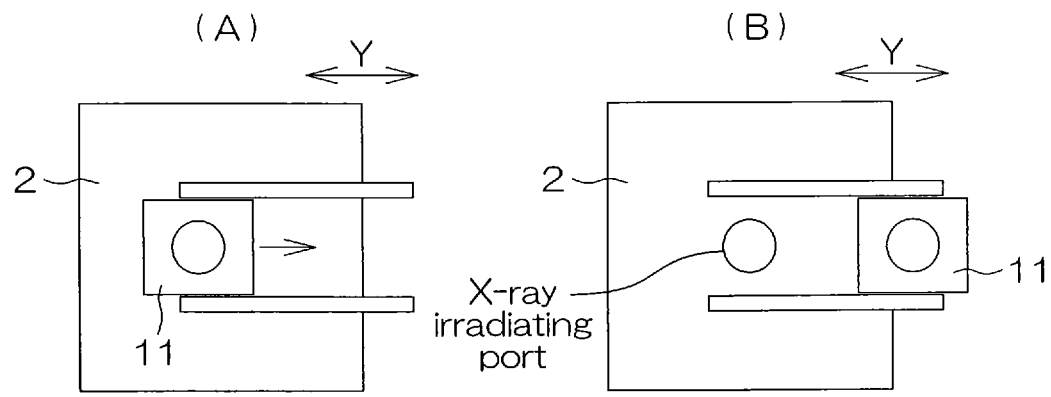
FIG. 4 is a schematic view of an arrangement for withdrawing a first digital camera 11 from being on an X-ray radiography axis.

However, when the X-ray irradiating portion 2 irradiates X-rays to perform cephalometric radiography, the first digital camera 11 is arranged to be withdrawn to a position of not obstructing the irradiation of X-rays. For example, as shown in FIGS. 4(A) and (B), the first digital camera 11 is disposed such as to be slidably movable horizontally, for example, in the Y direction with respect to the housing of the X-ray irradiating portion 2. Therefore, in a state where the first digital camera 11 is withdrawn as shown in FIG. 4(B), X-ray irradiation by the X-ray irradiating portion 2 can be performed without hindrance.

Also, instead of disposing the camera optical axis of a first digital camera to be of the same straight line on the X-ray radiography axis, accommodation may be made by disposing a plurality of first digital cameras on the X-ray irradiating portion 2 with an X-ray irradiating port (X-ray radiography axis start position) as a center. For example, by disposing, on a y-axis centered at the X-ray irradiating port (X-ray radiography axis start position) and passing through a center thereof, two digital cameras at front and rear of the center or by disposing, on a Z-axis passing through the center point, two digital cameras above and below the center point such that respective camera optical axes are parallel to the X-ray radiography axis, a lateral image that is centered at the external auditory canals and is in accordance with a camera image taken from an X-ray radiography direction can be obtained from respective images by performing, based on a horizontal reference plane and a vertical reference plane passing through the X-ray radiography axis, correction and display centered on an intersection of the planes, that is, on the external auditory canals on the X-ray radiography axis. Although it is not strictly the same as an image taken by a camera disposed on the X-ray radiography axis, since the horizontal reference plane and the vertical reference plane are accurately standardized in accordance with the radiography axis, an effect on positioning precision based on the respective reference planes passing through the radiography axis is the same. Also, by appropriately and consistently standardizing the positional relationships (placements) of the respective cameras with respect to the X-ray radiography port center, the external auditory canals and lateral camera images of the same states can always be obtained and therefore standardization precision and reproduction precision that are sufficient can be obtained. By this method, even if the above-described first digital camera is not withdrawn to a position of not obstructing X-ray radiography during X-ray radiography, equivalent precisions are obtained, thus leading to reduction of manufacturing cost of an image-taking apparatus and shortening of time of maintaining an image-taking head position.

A first monitor 13 for displaying an image imaged by the first digital camera 11 is connected to the first digital camera 11. The first monitor 13 may be disposed in a room of an operator that is partitioned from a room in which the cephalometric radiography apparatus 1 is disposed. The first monitor 13 can display a first horizontal reference line HL1 and a first vertical reference line VL1 that are determined by the optical axis of the first digital camera 11. That is, since a viewpoint direction of the first digital camera 11 is the optical axis direction in the X direction, the horizontal reference line extends horizontally in the Y direction with the optical axis as a center and the vertical reference line extends vertically in the Z direction with the optical axis as a center and therefore, an intersection of the first horizontal reference line HL1 and the first vertical reference line VL1 is the optical axis.

The first monitor 13 displays, together with the first horizontal reference line HL1 and the first vertical reference line VL1, a lateral head image of the patient as viewed in the optical axis direction in the X direction that is imaged by the first digital camera 11.

Figure 5:
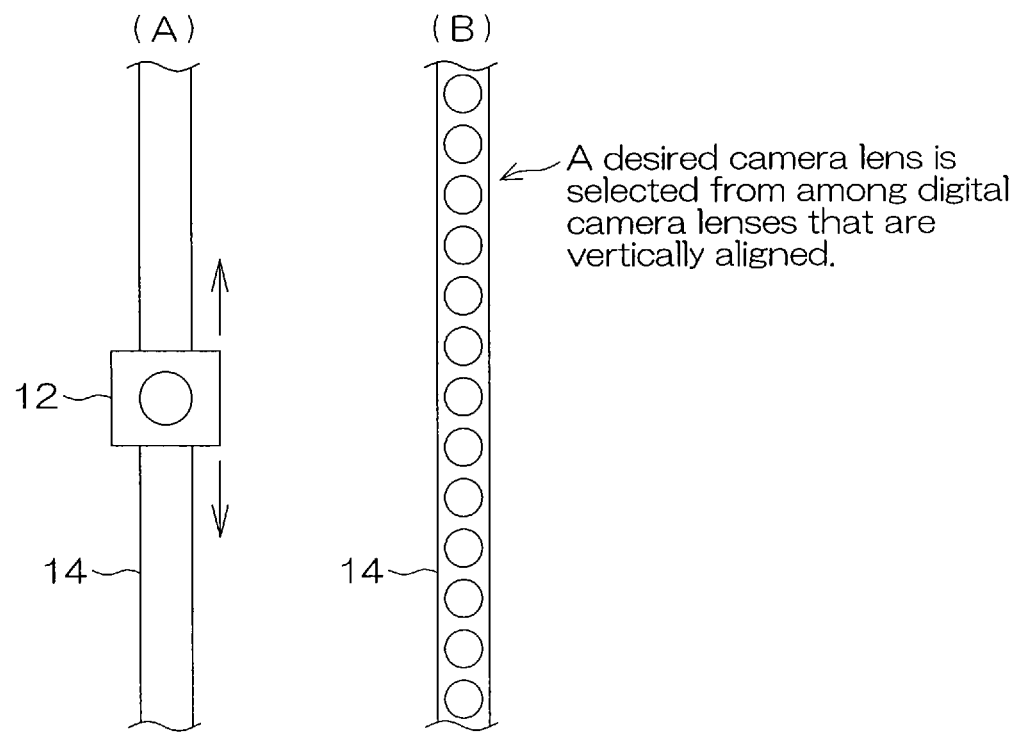
FIG. 5 is a schematic view of an arrangement for moving a second digital camera 12 vertically up and down.

The second digital camera 12 is disposed at a position of forming an angle of 90° with the optical axis of the first digital camera 11 in plan view. As one example, the second digital camera 12 is mounted to a support column 14 that is erected vertically on a base 6 and a height position thereof is made adjustable by up/down movement in the Z direction along the support column 14 as shown in FIG. 5. The support column 14 is disposed at a position separated by 15 cm from the X-ray detecting portion 3 as viewed in the X direction. The optical axis of the second digital camera 12 is thus an optical axis that extends horizontally in the Y direction at a position 15 cm away from the X-ray detecting portion 3 in the X direction. Also, since the optical axis of the second digital camera 12 extends in the Y direction and the optical axis of the first digital camera 11 extends in the X direction, the two optical axes have an angle of 90° in plan view.

The second digital camera 12 is a camera for imaging a facial side of the head of the patient and its position in the up/down direction can be adjusted in accordance with the patient's body height. As shall be described below, an optical axis of the second digital camera 12 is adjusted to be at a height of the eyes of the patient.

Here, an arrangement may be made where a one-way mirror 15 is disposed in front of a lens of the second digital camera 12 such that the patient cannot see the lens of the second digital camera 12 directly and the patient sees his/her own face appearing on the one-way mirror 15.

That is, by arranging such that the patient sees his/her own face appearing on the one-way mirror 15 and further marking a horizontal reference line and a median line in accordance with the camera position on the one-way mirror 15, it is made easy for the patient to adjust the head position in reference to the reference line on his/her own or in accordance with an instruction of a photographer.

Here, the one-way mirror 15 may be held fixedly by the support column 14 or may be arranged to move up/down together with the up/down movement of the second digital camera 12 when the second digital camera 12 is moved up/down along the support column 14.

A second monitor 16 for displaying an image imaged by the second digital camera 12 is connected to the second digital camera 12. The second monitor 16 may also be disposed in the room of the operator that is partitioned from the room in which the cephalometric radiography apparatus 1 is disposed. The second monitor 16 can display a second horizontal reference line HL2 and a second vertical reference line VL2 that are determined by the optical axis of the second digital camera 12. That is, since a viewpoint direction of the second digital camera 12 is the optical axis direction in the Y direction, the horizontal reference line extends horizontally in the X direction with the optical axis as a center and the vertical reference line extends vertically in the Z direction with the optical axis as a center and therefore, an intersection of the second horizontal reference line HL2 and the second vertical reference line VL2 indicates the optical axis.

The second monitor 16 displays, together with the second horizontal reference line HL2 and the second vertical reference line VL2, the facial side of the head of the patient as viewed in the optical axis direction in the Y direction that is imaged by the second digital camera 12.

If the first monitor 13 and the second monitor 16 are disposed, for example, alongside each other in the room of the operator, the operator can, while viewing the first monitor 13 and the second monitor 16 at the same time, perform positioning of the head of the patient correctly based on the lateral head image of the patient as seen from the viewpoint of the first digital camera 11 and a facial head image as seen from the viewpoint of the second digital camera 12 having an angle of 90° with respect to the first digital camera 11 before the cephalometric radiography.

A specific example of a method for positioning the head shall now be described.

(1) First, the operator instructs the patient to place the feet on an image-taking position of the cephalometric radiography apparatus 1 and stand in a normal posture with the back straight.

The cephalometric radiography apparatus 1 has the base 6 that is disposed horizontally and since a feet position indication 7 that is based on an image-taking direction and position and on which an image-taking subject should stand is indicated on the base 6, the patient stands upright in a normal posture on the base 6 in accordance with the feet position indication 7.

(2) A lateral positioning step is performed.

In the lateral positioning step, the operator, while viewing the display on the first monitor 13, adjusts a height of the first digital camera 11 such that the intersection of the first horizontal reference line HL1 and the first vertical reference line VL1 that corresponds to the optical axis of the first digital camera 11 is set at a height of the external auditory canal center of the patient.

Figure 6:
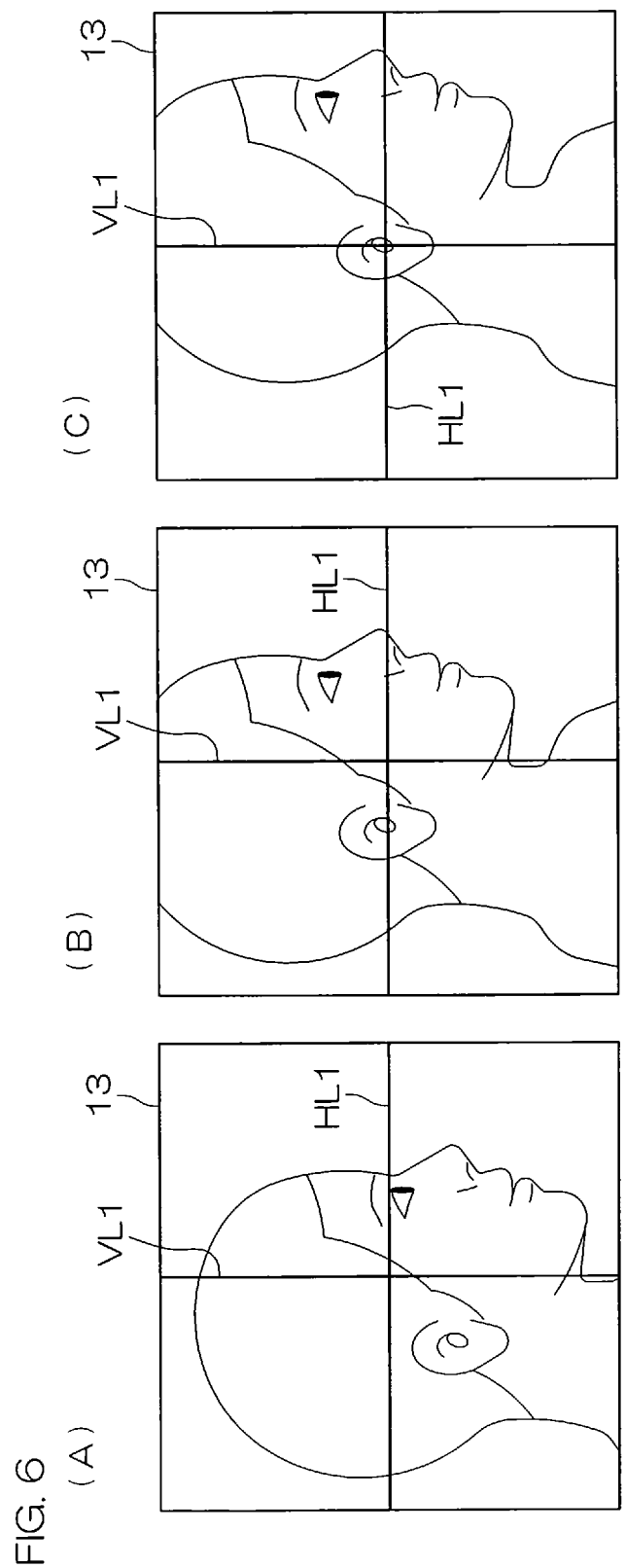
FIGS. 6(A), (B), and (C) are illustrative views showing a lateral positioning step.

For example, if the displayed image on the first monitor 13 is the image shown in FIG. 6(A), the X-ray irradiating portion 2 and the X-ray detecting portion 3 that are held by an arm 8 are displaced upward along the support column 5. Here, since the support column 5 is erected vertically on the horizontal base 6, the X-ray irradiating portion 2 and the X-ray detecting portion 3 are displaced vertically upward. As mentioned above, the first digital camera 11 is mounted to (the housing of) the X-ray irradiating portion 2 and therefore, in accompaniment with the upward displacement of the X-ray irradiating portion 2, the first digital camera 11 is also displaced upward and its horizontal optical axis is displaced upward while remaining horizontal.

In a state where the displayed image on the first monitor 13 thereby becomes the image shown in FIG. 6(B), a height position of the first digital camera 11 is fixed and the height position is stored. The height position of the first digital camera 11 at this point can be expressed by a height position of the arm 8 on the support column 5 and therefore, this height position may be stored instead.

Even when the displayed image on the first monitor 13 becomes the image shown in FIG. 6(B), the optical axis of the first digital camera 11 (the intersection of the first horizontal reference line HL1 and the first vertical reference line VL1) is not set at the center of the external auditory canals of the patient. This means that the head of the patient is located slightly toward the rear.

The operator thus gives the patient an instruction telling him/her to move the head slightly forward. And when, while viewing the image on the first monitor 13 imaged by the first digital camera 11, the head of the patient becomes set at the position shown in FIG. 6(C), the patient is instructed to keep his/her present position/state.

(3) A frontal positioning step is performed.

In the frontal positioning step, the operator gives an instruction to the patient while viewing the displayed image on the second monitor 16 such that the image becomes that in which the facial side of the head of the patient faces straight forward. For example, if the patient's line of sight tends to be directed downward, the patient is instructed to lift his/her face or if the patient's face is facing upward, the patient is instructed to draw his/her chin in and look forward. By this instruction, the facial side of the head of the patient is put in a state of facing straight forward with a tilt in the up/down direction being straightened.

Figure 7:
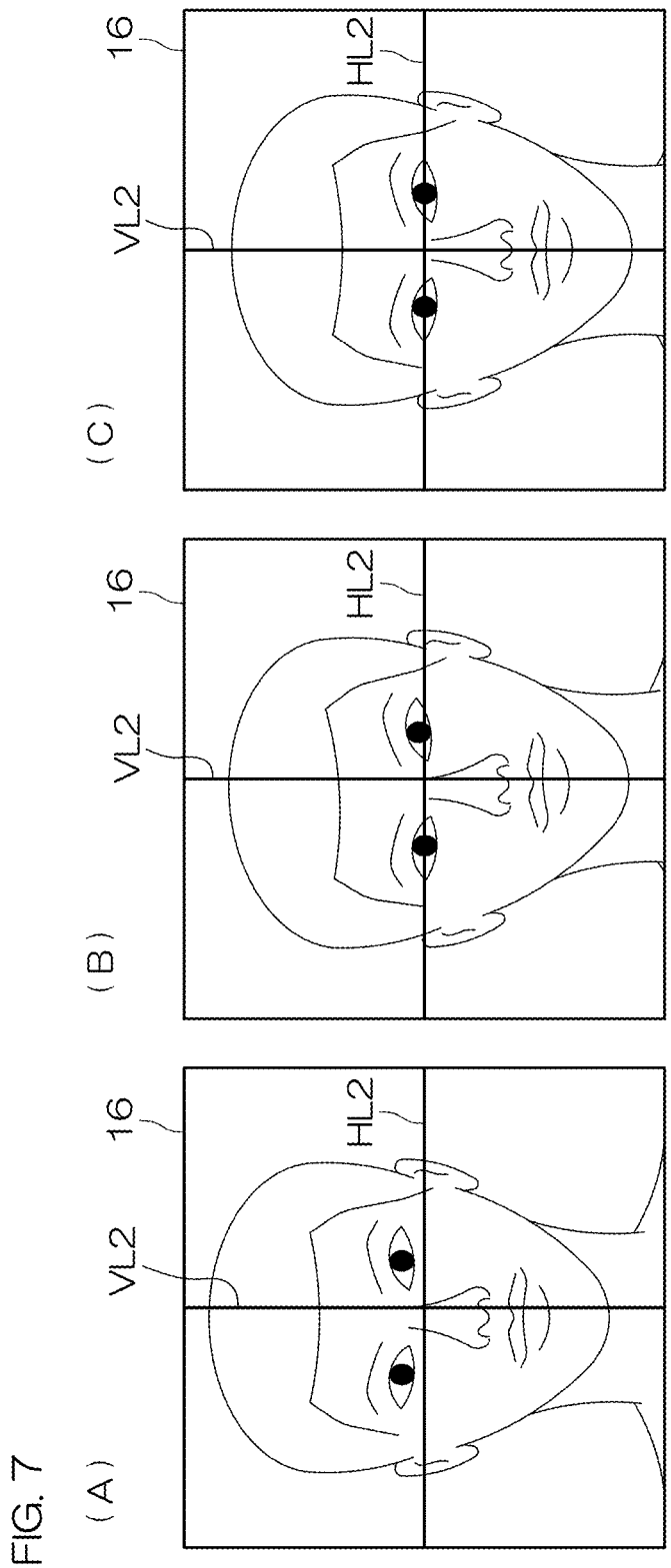
FIGS. 7(A), (B), and (C) are illustrative views showing a frontal positioning step.

Here, if the displayed image on the second monitor 16 is the image shown in FIG. 7(A), the height position of the second digital camera 12 is slightly low and therefore, the height position of the second digital camera 12 is displaced vertically upward along the support column 14. And, in a state where the displayed image on the second monitor 16 becomes the image shown in FIG. 7(B), the height position of the second digital camera 12 is fixed and the height position stored. Since the support column 14 supporting the second digital camera 12 is erected vertically on the horizontal base 6, the height position of the second digital camera 12 can be expressed by a height position on the support column 14 and therefore, this height position may be stored instead.

The state in which the displayed image on the second monitor 16 is the image shown in FIG. 7(B) is that in which the facial side of the head of the patient is tilted slightly to the right. The operator thus gives the patient an instruction telling him/her to raise the head slightly leftward.

Also, in the display on the second monitor 16, the second vertical reference line VL2 corresponds to being the median line of the facial side of the head of the patient. An orientation in the right/left direction of the facial side of the head is thus adjusted by giving the patient an instruction such that the facial side of the head of the patient becomes right-left symmetrical with respect to the second vertical reference line VL2 or specifically such that the second vertical reference line VL2 becomes positioned between the right and left eyeballs or such that the second vertical reference line VL2 passes through a middle of the nose.

In this process, by disposing the one-way mirror 15, marked with the horizontal reference line and the median reference line passing through the second digital camera optical axis, on a front face of the second digital camera, the orientation and movement amount instructed by the operator are easily ascertained and realized based on a positional relationship of one's own face appearing on the one-way mirror 15 and the reference lines. Also, it is made easy to indicate the frontal side as one sees fit to the operator. Thereby, both the patient and the operator can ascertain and arrive at a frontal orientation in common that is satisfactory to both. This is effective for both the patient and the operator to ascertain a treatment goal that both have in mind as an image and thereby leads to aiming at and achieving treatment results, including symmetry based on the frontal orientation recognized in common, that are satisfactory to the patient, in other words, to increasing treatment satisfaction of the patient.

And, in a state where the displayed image on the second monitor 16 becomes the image shown in FIG. 7(C), the patient is instructed to keep the present position/state.

(4) The recording step is performed.

The recording step is performed after the position of the head of the patient has been set at the predetermined position in the lateral positioning step and the frontal positioning step described above. Before performing the recording step, the displayed image on the first monitor 13 and the displayed image on the second monitor 16 are checked and if a displayed image is shifted due to the patient having moved, etc., the lateral positioning step and the frontal positioning step may be performed again to set the position of the head of the patient at the predetermined position.

In the recording step, shutters of the first digital camera 11 and the second digital camera 12 are released to save and record the lateral head image and the facial head image that are being imaged. Shutter operations of the first digital camera 11 and the second digital camera 12 may be performed simultaneously by remote operation.

The lateral head image imaged by the first digital camera 11 may be recorded in association with the first horizontal reference line HL1 and the first vertical reference line VL1. Similarly, the facial head image imaged by the second digital camera 12 may be recorded in association with the second horizontal reference line and the second vertical reference line.

Also, the height position of the first digital camera 11 and the height position of the second digital camera 12 are also recorded together in the recording step.

Although a personal computer or a memory, etc., for executing the recording step described above are not shown in the arrangement schematic diagrams of the cephalometric radiography apparatus incorporating the head positioning standardization apparatus shown in FIGS. 1 to 3, the recording step is performed by a personal computer and a memory connected to the first digital camera 11 and the second digital camera 12 and to the first monitor 13 and the second monitor 16.

After the head of the patient has been positioned in an image-taking space of the cephalometric radiography apparatus 1 by the above processing, X-rays are irradiated from the X-ray irradiating portion 2 and X-rays transmitted through the positioned head are detected by the X-ray detecting portion 3 and a so-called cephalogram is obtained. Here, as mentioned above, when X-rays are irradiated from the X-ray irradiating portion 2, the first digital camera 11 is automatically withdrawn to a position of not obstructing the X-ray irradiation.

Also, the obtained cephalometric radiograph may be stored in association with the lateral head image and the facial head image recorded in the recording step described above.

Next, a positioning method in a case of performing head positioning standardization of a patient in order to perform cephalometric radiography again on the same patient after elapse of a certain period shall be described.

(1) The patient stands upright in a normal posture on the base 6 and in accordance with the feet position indication 7 in the cephalometric radiography apparatus 1. If at this point, an image of a fixed-point digital camera for feet with which image-taking of a feet position of the patient has been performed in the previous head positioning is available, that image may be referenced to make the patient stand at the same position (same position in accordance with the feet position indication 7) of the base 6 as the previous time.

(2) The lateral positioning step is performed.

In the lateral positioning step, the height position of the first digital camera 11 recorded in the previous positioning is read out and the height of the first digital camera 11 is set to the read-out height. Specifically, the X-ray irradiating portion 2 and the X-ray detecting portion 3 that are held by the arm 8 are displaced along the support column to set the height positions of the X-ray irradiating portion 2, the X-ray detecting portion 3, and the first digital camera 11 to the height positions used in the previous lateral positioning.

Thereby, an image that is approximate to the image shown in FIG. 6(B) or the image shown in FIG. 6(C) and in which the first horizontal reference line HL1 passes through the center of the external auditory canals of the patient is displayed on the first monitor 13. That is, it is displayed that the state is that in which the height of the first digital camera 11 is set at the desired height but the position in the front/rear direction of the head of the patient is not matched with the desired position.

The operator thus gives the patient an instruction to move the head forward or rearward and when the head of the patient is set at the position shown in FIG. 6(C), that is, when the optical axis of the first digital camera 11 (the intersection of the first horizontal reference line HL1 and the first vertical reference line VL1) is set at the center of the external auditory canals of the patient, the patient is instructed to keep his/her present position/state.

Also, in the lateral positioning step, the lateral head image, the first horizontal reference line HL1, and the first vertical reference line VL1 recorded in the previous positioning may be read out and displayed overlappingly on the display on the first monitor 13. The display of the read-out first horizontal reference line HL1 and first vertical reference line VL1 on the first monitor 13 overlaps completely with the presently displayed first horizontal reference line HL1 and the first vertical reference line VL1. On the other hand, although it is normal for the read-out lateral head image not to overlap completely with the present image due to changes in hairstyle, changes with time, etc., in facial expression, etc., of the patient, overlap is achieved in regard to the central position of the external auditory canals. Therefore, a characteristic point in the previous image may be searched for and the head position may be adjusted such that it overlaps with that in the present image or such that contours overlap approximately.

(3) The frontal positioning step is performed.

In the frontal positioning step, the height position of the second digital camera 12 that was recorded in the previous positioning is read out and the height of the second digital camera 12 is set to the read-out height.

Then, while viewing a display screen of the second monitor 16, the operator gives an instruction to the patient such that the image becomes that in which the facial side of the head of the patient faces straight forward. For example, if the patient's line of sight tends to be directed downward, the patient is instructed to lift his/her face or if the patient's face is facing upward, the patient is instructed to draw his/her chin in and look forward. By this instruction, the facial head image of the patient appearing on the second monitor 16 becomes an image of the state of facing straight forward with the tilt in the up/down direction being straightened.

Thereby, an image that is approximate to the image shown in FIG. 7(B) is displayed on the second monitor 16. That is, the image is a facial head image of the state in which the patient faces straight forward.

The state in which the displayed image on the second monitor 16 is the image that is approximate to the image shown in FIG. 7(B) is a state in which a tilt to the right/left of the facial side of the head of the patient is not adjusted and the orientation in the right/left direction of the facial side of the head of the patient is not adjusted.

The operator thus gives an instruction to the patient to adjust the tilt to the right/left of the facial side of the head of the patient such that the second horizontal reference line HL2 passes through centers of the right and left eyeballs. Also, an orientation in the right/left direction of the facial side of the head is adjusted such that the second vertical reference line VL2 passes vertically through a middle between the right and left eyes. Here, the orientation in the right/left direction of the facial side of the head may be adjusted such that when the second vertical reference line VL2 passes vertically through the middle between the right and left eyes, the second vertical reference line VL2 passes vertically through the middle of the nose or passes vertically through a middle of the mouth.

Also, in the frontal positioning step, the facial head image, the second horizontal reference line HL2, and the second vertical reference line VL2 recorded in the previous positioning may be read out and displayed overlappingly on the display on the second monitor 16. The display of the read-out second horizontal reference line HL2 and second vertical reference line VL2 on the second monitor 16 overlaps completely with the presently displayed second horizontal reference line HL2 and the second vertical reference line VL2.

On the other hand, although it is normal for the read-out facial head image not to overlap completely with the present image due to changes in hairstyle, changes with time, etc., in facial expression, etc., of the patient, overlap is achieved in regard to the point that the second horizontal reference line HL2 passes through the centers of the right and left eyeballs. Therefore, a characteristic point, etc., in the previous image may be searched for and the position of the facial side of the head may be adjusted such that it overlaps with that in the present image or such that contours of the face overlap approximately.

And, in a state where the displayed image on the second monitor 16 becomes the image shown in FIG. 7(C), the patient is instructed to keep the present position/state.

(4) The recording step is performed.

Since the details of the recording step are the same as the details of the recording step described above, redundant description shall be omitted here.

By the above processing, the head of the patient is standardized and positioned, in the image-taking space of the cephalometric radiography apparatus 1, at exactly the same position as that in the previous cephalometric radiography. Thus, after the positioning, X-rays are irradiated from the X-ray irradiating portion 2 and X-rays transmitted through the positioned head are detected by the X-ray detecting portion 3 and a so-called cephalogram is obtained.

The cephalogram obtained in the previous cephalometric radiography and the cephalogram obtained in the present cephalometric radiography are both photographs taken by X-ray image-taking of the head that has been positioned by the head positioning standardization method according to the preferred embodiment of the present invention. The two cephalograms are thus standardized X-ray radiograms that are high in standardization precisions of the frontal and lateral head positions of the head, are also matched in terms of clinical grounds, and are useful for performing maxillofacial morphology diagnosis and treatment of the patient with high precision by comparison and contrasting of contents of the two photographs.

Second Preferred Embodiment

Figure 8:
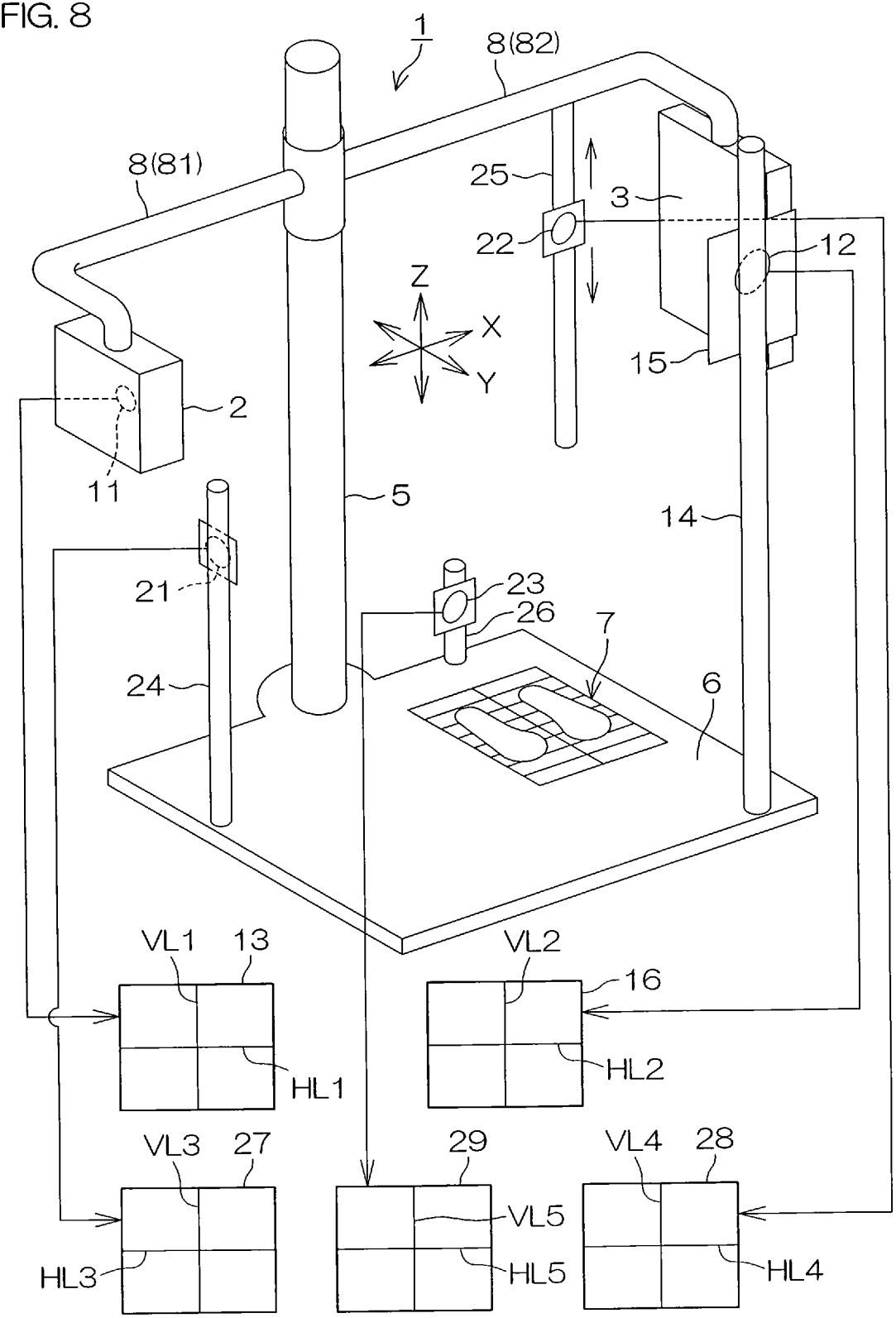
FIG. 8 is a perspective view showing an arrangement schematic of a state in which a head positioning standardization apparatus according to another preferred embodiment of the present invention is incorporated in a cephalometric radiography apparatus.
Figure 9:
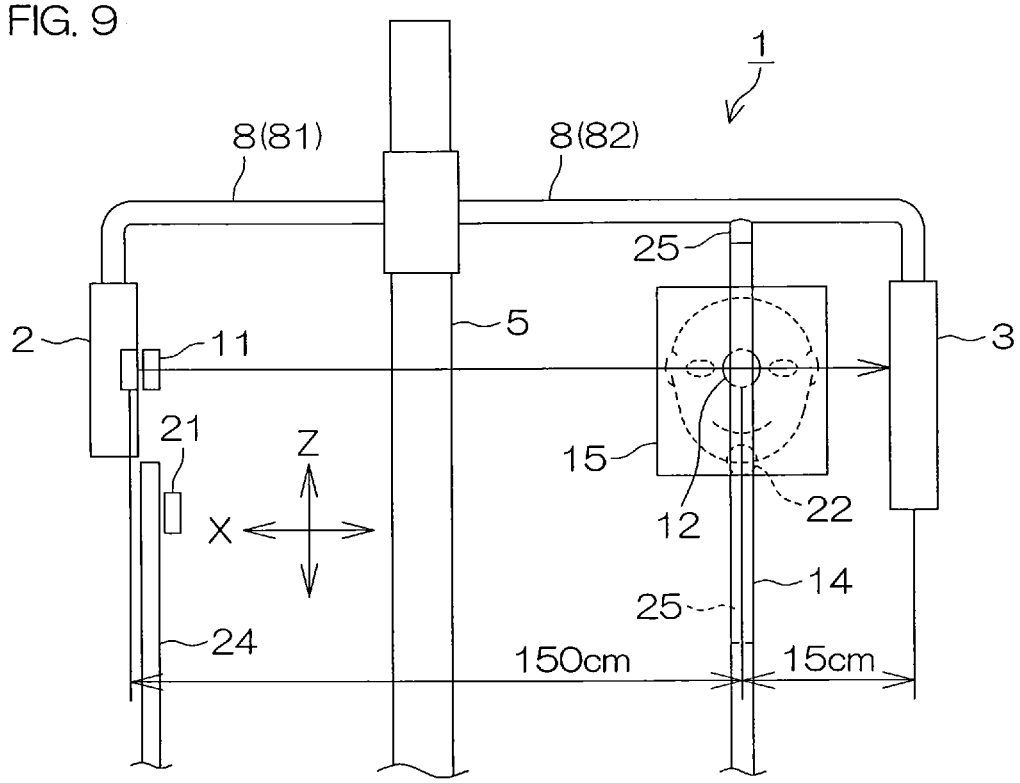
FIG. 9 is a front view showing an arrangement schematic of the cephalometric radiography apparatus incorporating the head positioning standardization apparatus shown in FIG. 8.
Figure 10:
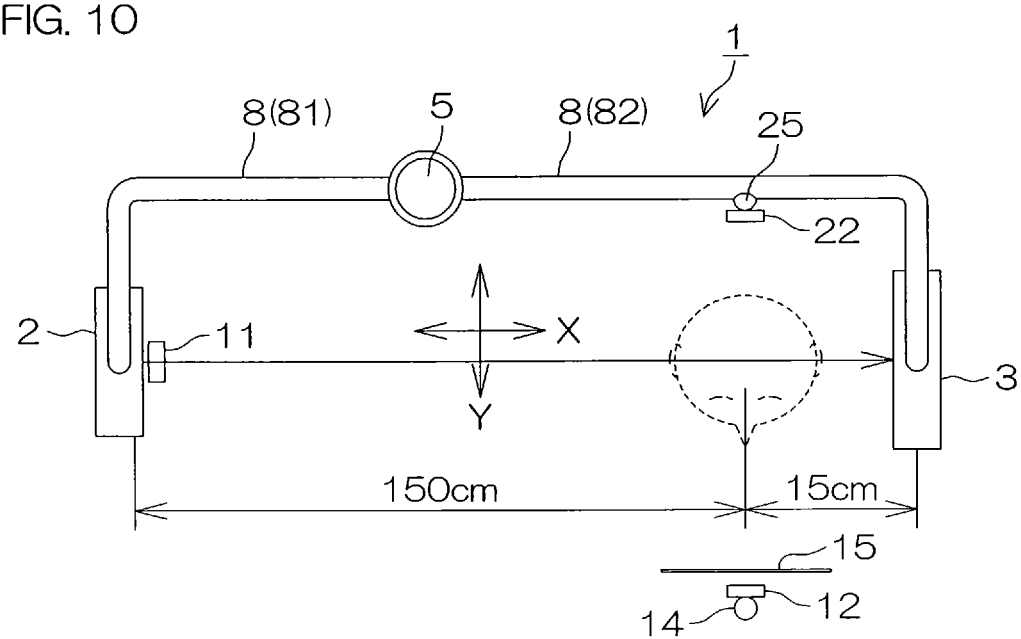
FIG. 10 is a plan view showing the arrangement schematic of the cephalometric radiography apparatus incorporating the head positioning standardization apparatus shown in FIG. 8.

FIG. 8 is a perspective view showing an arrangement schematic of a state in which a head positioning standardization apparatus according to another preferred embodiment of the present invention is incorporated in a cephalometric radiography apparatus. Also, FIG. 9 is a front view showing an arrangement schematic of the cephalometric radiography apparatus incorporating the head positioning standardization apparatus shown in FIG. 8 and FIG. 10 is a plan view showing the arrangement schematic of the cephalometric radiography apparatus incorporating the head positioning standardization apparatus shown in FIG. 8. In regard to description of directions in FIGS. 8 to 9, a right/left direction shall be referred to as an X direction, a front/rear direction shall be referred to as a Y direction, and an up/down direction shall be referred to as a Z direction in the following.

Referring to FIGS. 8 to 10, the cephalometric radiography apparatus 1 includes the base 6 an upper surface of which is installed horizontally, the support column 5 erected on a rear edge of the base 6 and extending vertically upward, and a pair of arms 8 (81 and 82) mounted to the support column 5, extending horizontally to both sides in the X direction, and with tips thereof extending in the Y-direction, the X-ray irradiating portion 2 is fixed to the tip of the arm 81, and the X-ray detecting portion 3 is fixed to the tip of the arm 82. Also, the distance between the X-ray irradiating portion 2 and the X-ray detecting portion 3 is set to 165 cm in the X direction and design is made such that the head center of an image-taking subject (median plane of a patient) is positioned at a position 15 cm in front of the X-ray detecting portion 3 as seen in the X direction from the X-ray irradiating portion 2. This is a universal cephalometric radiography standard.

This preferred embodiment is arranged such as to perform positioning standardization of the head using two digital cameras, namely, the first digital camera 11 and the second digital camera 12 to position the head center (that is, the median plane) of the image-taking subject at the position 15 cm in front of the X-ray detecting portion 3. This arrangement is the same as the arrangement in the first preferred embodiment described above and therefore, constituent elements that are the same shall have the same reference No./reference sign attached thereto and redundant description shall be omitted.

A further feature of this preferred embodiment is that a third digital camera 21 and a fourth digital camera 22 are provided and, in addition to head positioning standardization, a posture (body axis) of the patient during image taking is checked and positioned, like the head position, using the viewpoints of the digital cameras from two orthogonal directions. Further, a fifth digital camera 23 for imaging the feet position is provided.

To describe specifically, the third digital camera 21 is held by a support column 24 erected on a left side edge of the base 6 and extending vertically upward. The support column 24 is disposed at the same Y direction position as the X-ray irradiating portion 2 and the first digital camera 11 in plan view. The third digital camera 21 is thereby set such that its lens optical axis is parallel to the lens optical axis of the first digital camera and such that vertical reference lines are set at the same position in the Y direction. That is, a design is made such that the lens optical axis of the third digital camera 21 is positioned in the vertical direction of the first digital camera.

Also, an auxiliary arm 25 descending vertically from the arm 82 is provided and the fourth digital camera 22 is held by the auxiliary arm 25. The auxiliary arm 25 is disposed at the same position as the support column 14 as viewed in the X direction in plan view or frontal view. That is, it is disposed at a position separated by 15 cm from the X-ray detecting portion 3 in the X direction. The fourth digital camera 22 is thereby set such that its lens optical axis is parallel to and is the same straight line in plan view as the lens optical axis of the second digital camera.

Further, at the rear edge of the base 6, an auxiliary support column 26 is erected vertically at a position separated by 15 cm to the left from the X-ray detecting portion 3 as viewed in the X direction in plan view. The fifth digital camera 23 is held by the auxiliary support column 26. A lens optical axis of the fifth digital camera 23 is directed in the Y direction and toward the feet position indication 7.

To the third digital camera 21, the fourth digital camera 22, and the fifth digital camera 23 are respectively connected a third monitor 27, a fourth monitor 28, and a fifth monitor 29 for displaying images imaged by the respective digital cameras 21, 22, and 23.

A method for positioning the head of the cephalometric radiography apparatus 1 incorporating the head positioning standardization apparatus shown in FIGS. 8 to 10, like the method for positioning the head of the cephalometric radiography apparatus 1 described with reference to FIGS. 1 to 3, is mainly constituted of performing a lateral positioning step concerning the lateral side of the head that is performed by viewing in the viewpoint direction of the first digital camera 11 and a frontal positioning step concerning the facial side of the head that is performed by viewing in the viewpoint direction of the second digital camera 12 and further includes a lateral body axis positioning step concerning posture that is performed by viewing in the viewpoint direction of the third digital camera 21 and a back body axis positioning step concerning posture that is performed by viewing in the viewpoint direction of the fourth digital camera 22.

Also, a positioning step for feet that is performed by viewing in the viewpoint direction of the fifth digital camera 23 may be included.

Regarding the posture, an aim is not to accomplish fine positioning but is to capture a center of the posture, that is, the body axis. If the body axis is curved strongly, etc., there may also be an influence on the positioning of the head that is supported via the cervical vertebrae. It is therefore necessary in positioning standardization of the head to keep a relationship of the head position and the posture in a morphologically fixed relationship.

Thus, in this preferred embodiment, in performing the positioning of the head, the lateral body axis positioning step and the back body axis positioning step are performed prior to the lateral positioning step concerning the lateral side of the head and the frontal positioning step concerning the facial side of the head such that the positioning of the head is performed after positioning to a correct, standardized posture.

Also, although for cephalometric radiography, the patient stands upright in a normal posture on the base 6 of the cephalometric radiography apparatus 1, if, at that point, the feet position of the patient is deviated from an image-taking region central position and the image-taking direction or differs each time image taking is performed, there will be influences on the positioning of the head and reproducibility.

Thus, in performing image taking, first, a feet positioning step of viewing the feet position of the patient in the viewpoint direction of the fifth digital camera 23 and setting it at a fixed position in accordance with the head image-taking position and orientation.

A specific example of the method for positioning the head in the cephalometric radiography apparatus 1 incorporating the head positioning standardization apparatus shown in FIGS. 8 to 10 shall now be described.

(1) The feet positioning step is performed.

In the feet positioning step, the operator instructs the patient to place the feet on an image-taking place of the cephalometric radiography apparatus 1 and stand in a normal posture with the back straight.

The cephalometric radiography apparatus 1 has the base 6 that is disposed horizontally and since the feet position indication 7 on which the image-taking subject should stand is indicated on the base 6, the patient stands upright in a normal posture on the base 6 in accordance with the feet position indication 7.

If, in this process, the feet position of the patient is, for example, such that both feet are too close to each other or the feet are separated too far, etc., the operator gives an instruction to the patient to correct the feet position. The feet position of the patient in this case is checked by the image imaged in the viewpoint direction of the fifth digital camera 23 and displayed on the fifth monitor 29.

Figure 11:
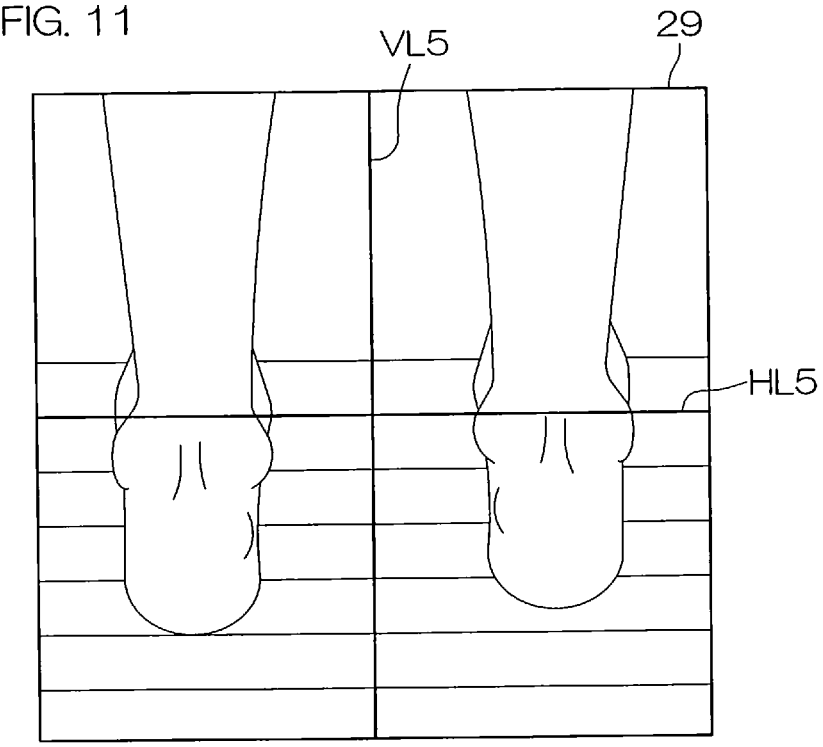
FIG. 11 is an example of an image of a feet position appearing on a fifth monitor 29.

Then, when the feet position of the patient is set, a shutter of the fifth digital camera 23 is released and the image appearing on the fifth monitor 29 is recorded in the memory. FIG. 11 shows an example of a recorded image related to feet position.

(2) The lateral body axis positioning step is performed.

Figure 12:
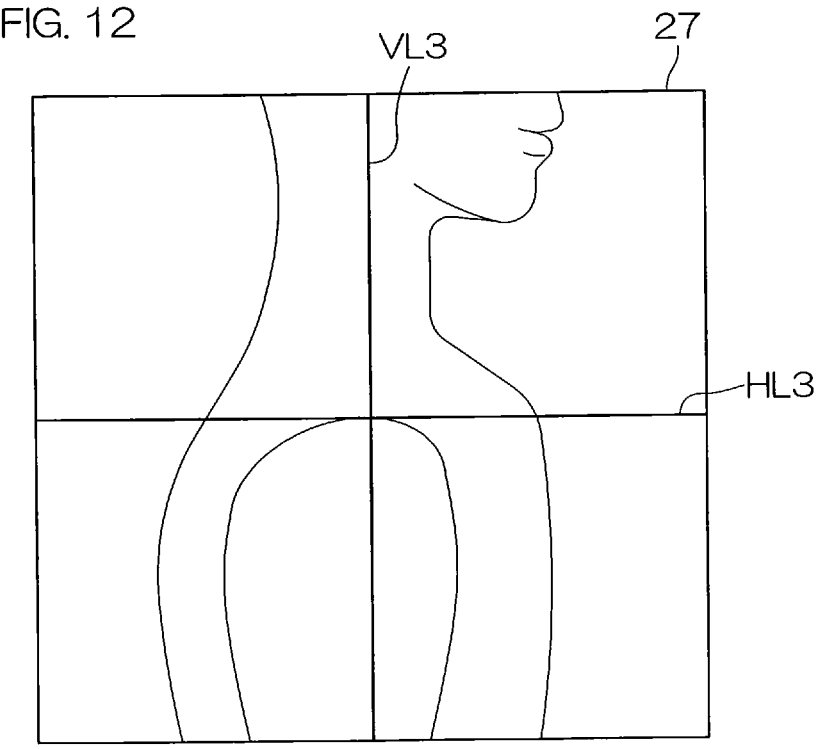
FIG. 12 is an example of an image appearing on a third monitor 27 after adjustment.

In the lateral body axis positioning step, the operator, while viewing the display on the third monitor 27, adjusts a height of the third digital camera 21 such that a third horizontal reference line HL3 that extends horizontally to the right and left from the optical axis of the third digital camera 21 is set, for example, at a height of the tops of the shoulders of the patient. Also, the patient is instructed to adjust the position of the body in the front/rear direction such that a third vertical reference line VL3 extending vertically up and down from the optical axis of the third digital camera 21 (this third vertical reference line VL3 exists on the same straight line as the first vertical reference line VL1 of the first digital camera 11) passes through a position at which the body of the patient is divided substantially equally into front and rear. An example of an image that appears on the third monitor 27 after adjustment is shown in FIG. 12. From FIG. 12, it can be understood that the posture of patient is that of standing in a normal posture and the center of the posture, that is, the body axis is set along the third vertical reference line VL3.

(3) The back body axis positioning step is performed.

In the back body axis positioning step, the operator, while viewing the display on the fourth monitor 28, adjusts a height of the fourth digital camera 22 such that a fourth horizontal reference line HL4 that extends horizontally to the right and left from the optical axis of the fourth digital camera 22 is set, for example, at the height of the tops of the shoulders of the patient.

Or, for example, the height of the fourth digital camera is adjusted such as to be set at a height of an intermediate portion of the shoulders or waist of the patient. Or, a camera of a desired position may be selected from among a plurality of fourth digital cameras disposed on the same vertical reference line and a camera image thereof may be displayed on a monitor.

Also, the patient is instructed to adjust the position of the body in the right/left direction such that a fourth vertical reference line VL4 extending vertically up and down from the optical axis of the fourth digital camera 22 (this fourth vertical reference line VL4 exists on the same straight line as the second vertical reference line VL2 of the second digital camera 12) passes through a position at which the body of the patient is divided substantially equally into right and left. Also, if in this process, heights of the shoulders of the patient differ between the right and left and there arises a difference between the right and left in the heights of the shoulders with respect to the fourth horizontal reference line HL4, the patient is instructed to adjust a tilt of the posture in the right/left direction such that the heights of the right and left shoulders become equal.

Figure 13:
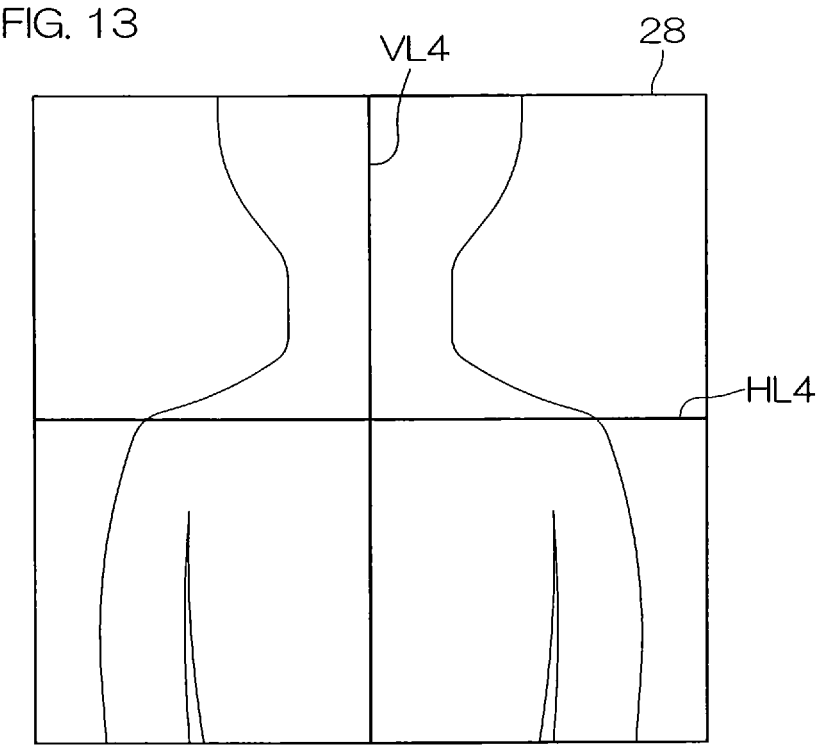
FIG. 13 is an example of an image appearing on a fourth monitor 28 after adjustment.

An example of an image that appears on the fourth monitor 28 after adjustment is shown in FIG. 13. From FIG. 13, it can be understood that the posture of patient is not tilted to the right and left and also the center of the posture, that is, the body axis is set along the fourth vertical reference line VL4.

(4) The lateral positioning step is performed.

(5) The frontal positioning step is performed.

Since the details of the lateral positioning step and the frontal positioning step are exactly the same as the details described above, redundant description shall be omitted here.

(6) The recording step is performed.

The recording step is performed after the body axis of the patient has been positioned in the lateral body axis positioning step and the back body axis positioning step described above and the position of the head of the patient has been set at the predetermined position with high precision in the lateral positioning step and the frontal positioning step.

Before performing the recording step, the displayed image on the first monitor 13, the displayed image on the second monitor 16, the displayed image on the third monitor 27, and the displayed image on the fourth monitor 28 are checked to confirm that positions have not shifted due to the patient having moved, etc.

In the recording step, shutters of the first digital camera 11, the second digital camera 12, the third digital camera 21, and the fourth digital camera 22 are released to hold and record the lateral head image, the facial head image, the lateral body axis image, and the back body axis image that are being imaged. Shutter operations of the first digital camera 11, the second digital camera 12, the third digital camera 21, and the fourth digital camera 22 may be performed simultaneously by remote operation.

The lateral head image imaged by the first digital camera 11 may be recorded in association with the first horizontal reference line HL1 and the first vertical reference line VL1, the facial head image imaged by the second digital camera 12 may be recorded in association with the second horizontal reference line HL2 and the second vertical reference line VL2, the lateral body axis image imaged by the third digital camera 21 may be recorded in association with the third horizontal reference line HL3 and the third vertical reference line VL3, and the back body axis image imaged by the fourth digital camera 22 may be recorded in association with the fourth horizontal reference line HL4 and the fourth vertical reference line VL4.

Also, the height positions of the first digital camera 11, the second digital camera 12, the third digital camera 21, and the fourth digital camera 22 are also recorded together in the recording step.

After the feet position of the patient has been positioned, the body axis has been positioned, and the head has been positioned in the cephalometric radiography apparatus 1 by the above processing, X-rays are irradiated from the X-ray irradiating portion 2 and X-rays transmitted through the positioned head are detected by the X-ray detecting portion 3 and a so-called cephalogram is obtained. Here, when X-rays are irradiated from the X-ray irradiating portion 2, the first digital camera 11 is automatically withdrawn to a position of not obstructing the X-ray irradiation.

Third Preferred Embodiment

Figure 14:
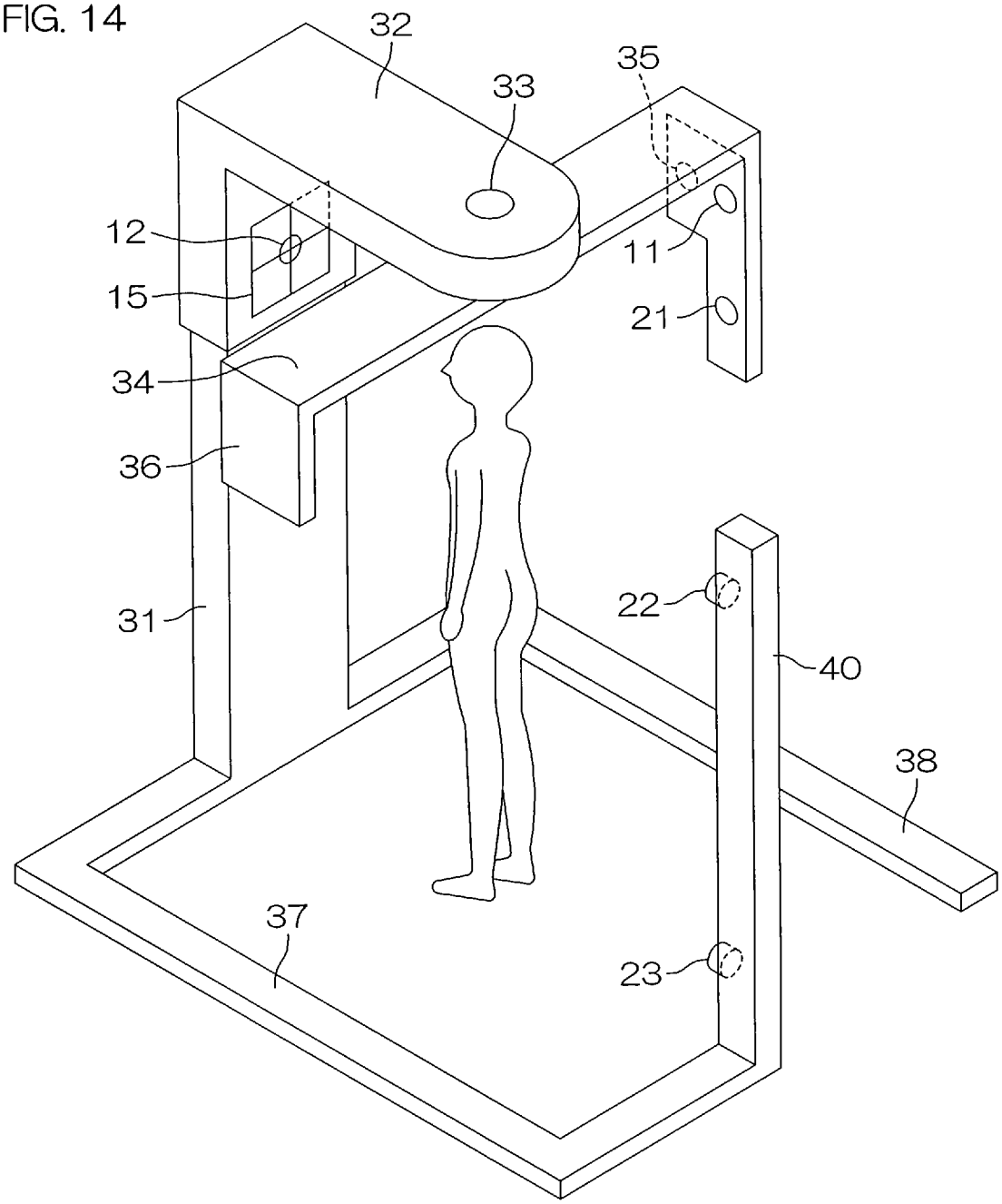
FIG. 14 is a perspective view showing an arrangement schematic of a state in which a head positioning standardization apparatus according to another preferred embodiment of the present invention is incorporated in a cone-beam head X-ray CT image-taking apparatus.

FIG. 14 is a perspective view showing an arrangement schematic of a state in which a head positioning standardization apparatus according to another preferred embodiment of the present invention is incorporated in a cone-beam head X-ray CT image-taking apparatus. Also, FIG. 15 is a plan view showing an arrangement schematic of the cone-beam head X-ray CT image-taking apparatus incorporating the head positioning standardization apparatus shown in FIG. 14.

Figure 15:
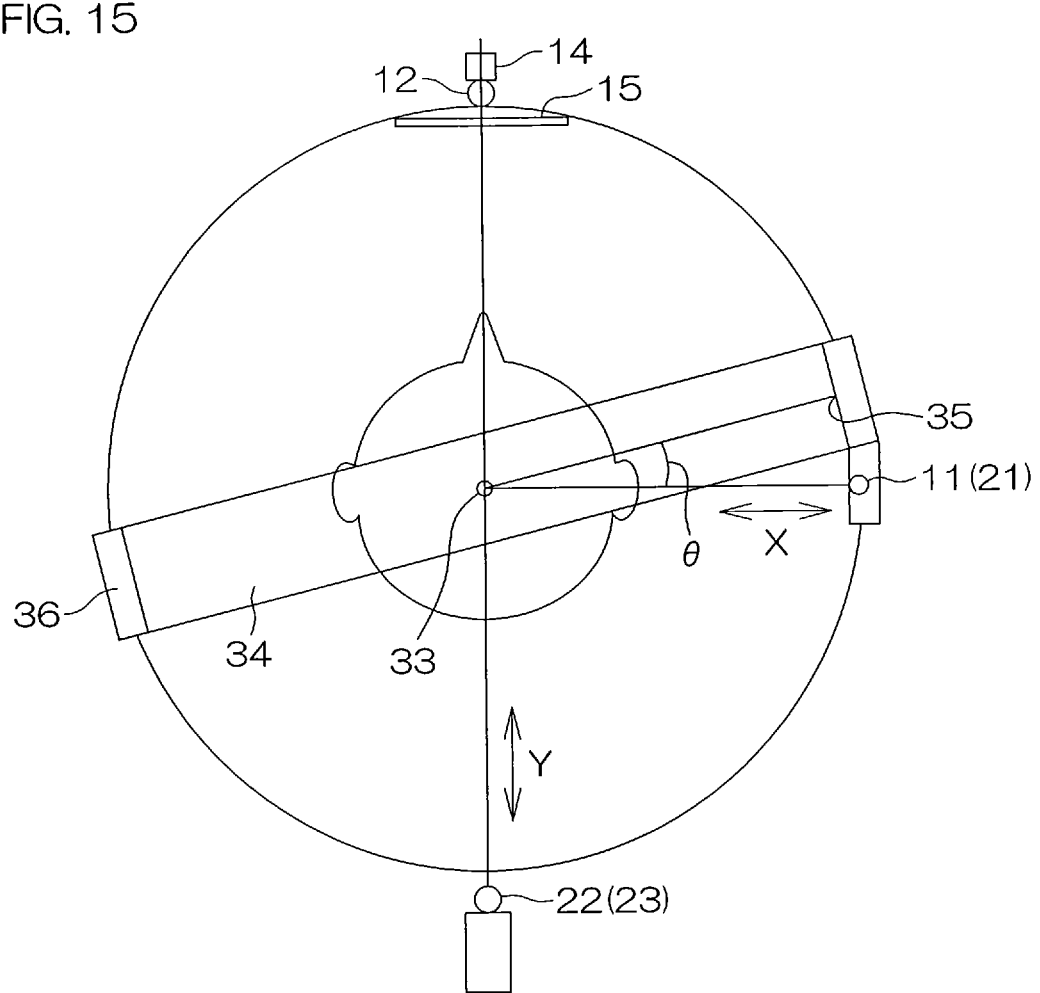
FIG. 15 is a plan view showing an arrangement schematic of the cone-beam head X-ray CT image-taking apparatus incorporating the head positioning standardization apparatus shown in FIG. 14.

Referring to FIGS. 14 and 15, a head CT image-taking apparatus 30 includes a vertically erected support column 31 and a support frame 32 that can move rectilinearly in the up/down direction (Z direction in a CT coordinate system) on the support column 31 and extending horizontally from an upper end thereof. A rotating arm 34 capable of rotational movement within a horizontal plane centered at a support shaft 33 disposed in the support frame 32 is equipped at a lower side of a tip of the support frame 32. An X-ray irradiating portion 35 is disposed at one end of the rotating arm 34 and an X-ray detecting portion 36 is disposed at another end of the rotating arm 34. In plan view, the X-ray irradiating portion 35 and the X-ray detecting portion 36 are opposed with the support shaft 33 as an origin. With respect to the head of a patient disposed in an image-taking space formed in a lower space of the support shaft 33, the head CT image-taking apparatus 30 irradiates X-rays from the X-ray irradiating portion 35 over a range of 180° to 360° in plan view while rotating the rotating arm 34 horizontally and generates an X-ray tomography image of the patient's head based on X-rays detected by the X-ray detecting portion 36.

A head positioning standardization apparatus for reproducibly positioning the head of the patient disposed in the image-taking space at a predetermined position with high precision before X-ray CT image taking is incorporated in the head CT image-taking apparatus 30.

The first digital camera 11 is adjustable in height position in the up/down direction in accordance with the head position of the patient by movement in the vertical up/down direction along a height direction of the support column 31 of the support frame 32. Also, in regard to position, the first digital camera 11 is arranged to be displaceable in position in up/down/front/rear (y-axis and z-axis) directions from an initial position in a state where the camera optical axis is maintained parallel and in accordance with a position of the external auditory canals in the head position at which the facial head region (lateral side) of the patient whose image is to be taken is appropriately disposed within a CT image-taking region (FOV). A movement adjustment position in this process is recorded with the initial position as a basis. (With CT, the image-taking region is fixed and in order to fit the entire face within the FOV with persons of long facial depth, persons who are high as well as persons who are low in position of the external ears, etc., the camera position for imaging the external ear must also be adjusted in accordance with the head position. In the case of CT, a magnification and a display orientation of an image are not changed by movement of the position of its camera and since if the movement position is recorded, the same position coordinates can be used to perform positioning and obtain high reproducibility in subsequent sessions as well, the digital camera is not necessarily required to be at the same position.)

Or, a mode in which not one but a plurality of the first digital cameras are disposed and a desired camera is selected from among a plurality of camera images is also allowable. Thereby, trouble of movement adjustment can be eliminated and even if movement adjustment is required, a minimum thereof will suffice.

Also, the second digital camera 12 having a horizontal (CT image-taking coordinate system y axis) camera optical axis that is directed toward the facial side of the head of the patient disposed in the image-taking space and forms, in plan view, an angle of 90° with the camera axis of the first digital camera 11 when the position of the first digital camera 11 is at a horizontal 0° (CT image-taking coordinate system x axis) position is included.

As one example, the second digital camera 12 is mounted to a patient face frontal side of the support frame 32 positioned at an upper portion of the support column 31 and is adjustable in height position in the up/down direction in accordance with the patient's head position by movement in the vertical up/down direction along the height direction of the support column 31 of the support frame 32. Also, the second digital camera 12 is arranged to be displaceable in position vertically upward and downward (in parallel to the z-axis) from an initial position in a state where the camera optical axis is maintained (parallel to the y-axis) and in accordance with right and left pupil positions of the patient. The movement position in this process is recorded with the initial position as a basis. (Since, unlike in X-ray image-taking, the first digital camera 11 position can also be adjusted, rather than adjusting the second camera position on a basis of the first camera position, it is easier to record and reproduce the first and second camera positions separately based on the respective initial positions. Consequently, an image of the facial head portion can always be taken in the same orientation in the same coordinate system.)

Or, by disposing second digital cameras 12 with the same optical axis on the median line and selecting the camera of the desired position at the height of the pupils or the canthi, movement can be omitted or movement adjustment can be restricted to the minimum. Also, the second digital camera 12 does not necessarily have to be on the median line and the same effects can also be obtained by disposing two cameras right/left symmetrically with the median line as the center. Also, in this case, a width between the right and left cameras can be adjusted and also, a center between the right and left camera positions can be moved in parallel to the right-left direction (y-axis direction) with respect to the median line. Thereby, positioning of diverse types of frontal orientation as in cases where there is a difference between a center between the right and left eyes and a median of the face, cases where the right and left eyes are asymmetrical, etc., can be accommodated. Even in this case, by disposing right/left pairs of two cameras each in plurality right/left symmetrically and in plurality in regular arrangement in the up/down direction, transition adjustment in the up/down direction and right/left direction can be made unnecessary or minimized by camera selection.

Also, by disposing and using in combination a camera on the median line and a right/left pair of cameras, the camera on the median line can be used to specify a characteristic point other than the eyes that is to serve as a median to adjust the median (right/left orientation) of the face and the right/left pair of cameras can be used to adjust the height of the eyes to position the up/down orientation of the face separately from optimal viewpoint directions.

Further, the one-way mirror 15 that reflects the frontal head position of the patient is disposed vertically in front of the second digital camera 12. A horizontal reference line and a median line based on the second digital camera 12 are indicated on the one-way mirror and can move integrally and similarly in accordance with the position of the second digital camera 12 being moved and adjusted up and down (but cannot move in a lateral direction). The operator's viewpoint and the patient's viewpoint can thereby be made the same such that an instruction to the patient concerning the head position and the content of the instruction of the operator can be confirmed more accurately by both parties to perform adjustment of the head position.

Even in this preferred embodiment, at least two digital cameras, namely, the first digital camera 11 and the second digital camera 12 that are orthogonal are used to accurately capture the image-taking frontal side and lateral side of the patient and perform highly precise positioning standardization, in accordance with the image-taking coordinate system, of the patient's head that is disposed in the image-taking space of the head CT image-taking apparatus 30.

Although during positioning, the first digital camera 11 is disposed in parallel to the CT image-taking coordinate system x-axis, it is not on the x-axis but is disposed at a position corresponding to the external auditory canals, the tragi, etc., and thus does not overlap in position with an X-ray irradiating port. Therefore, if the first digital camera 11 does not obstruct X-ray image taking, it is disposed on the X-ray irradiating portion 35 and in parallel to the X-ray irradiating port. However, if the first digital camera is disposed at a position of obstructing X-ray image taking, the X-ray irradiating portion may be extended and the first digital camera may be disposed at a position of angle θ as shown in FIG. 15. In this case, during camera image-taking, the first digital camera 11 is disposed at a position parallel to the x-axis of the CT image-taking coordinates and the second digital camera 12 is disposed on the y-axis and for X-ray image taking, the X-ray image taking may be started upon rotating the arm by the angle θ amount and moving it to a position where the X-ray image taking axis is set to the x-axis. Or, a mode where X-ray image taking is started from the camera image-taking position and x- and y-axes that are corrected for the angle θ amount by computation are used as the image-taking coordinates in the process of image processing is also allowable.

The head positioning standardization apparatus may also be of an arrangement that further includes the third digital camera 21 and the fourth digital camera 22 and, in addition to head positioning standardization, enables the posture (body axis) of the patient during image taking to be checked and positioned using the viewpoints of the digital cameras from two orthogonal directions in the same manner as for the head position. Also, the fifth digital camera 23 for imaging the feet position may also be included.

Specifically, the first digital camera 11 is provided with a mounting plate 39 that extends vertically downward and the third digital camera 21 is disposed on the mounting plate 39 such as to be displaceable up and down. The lens optical axis of the third digital camera 21 is an optical axis that extends in parallel to the lens optical axis of the first digital camera 11.

Or, the third digital camera 21 may be disposed, on a support column 40 extending vertically upward from a leg portion 38 extending out horizontally along a floor from a lower end of the support column 31, such that its camera lens optical axis is parallel to a patient direction parallel to the X-ray image-taking axis on a vertical reference plane passing through the X-ray image taking axis.

Also, a position at which the patient stands is demarcated by leg portions 37 and 38 that extend out horizontally along the floor from the lower end of the support column 31. In addition, the support column 40 is erected vertically at a tip of the leg portion 37 at an angular position of −90° in plan view. The fourth digital camera 22 is held by an upper portion of the support column 40 such as to be displaceable up and down. The lens optical axis of the fourth digital camera 22 extends horizontally and in a center (origin) direction in plan view. The third digital cameras 21 and the fourth digital camera 22 may instead be disposed in plurality in the up/down direction. Thereby, movement adjustment in the up/down direction can be omitted or minimized by selection of the desired camera positions.

Further, the fifth digital camera 23 is mounted to a lower portion of the support column 39. The lens optical axis of the fifth digital camera 23 is directed forward and obliquely downward.

Also, although not illustrated, to the third digital camera 21, the fourth digital camera 22, and the fifth digital camera 23 are respectively connected the third monitor 27, the fourth monitor 28, and the fifth monitor 29 for displaying images imaged by the respective digital cameras 21, 22, and 23.

The positioning method for the head that is performed prior to CT image-taking with the head CT image-taking apparatus 30 incorporating the head positioning standardization apparatus shown in FIGS. 14 and 15 is practically the same as positioning method for the head that is performed with the cephalometric radiography apparatus 1 shown in FIGS. 8 to 10. The only difference is that the positioning of the head is performed with the rotating arm 34 being set at a position at which the position of the first digital camera 11 is fixed at the position of 0° in plan view.

Therefore, the specifics of (1) performing the feet positioning step, (2) performing the lateral body axis positioning step, (3) performing the back body axis positioning step, (4) performing the lateral positioning step, (5) performing the frontal positioning step, and (6) performing the recording step are the same as in the method described above and redundant description shall thus be omitted.

Figure 16:
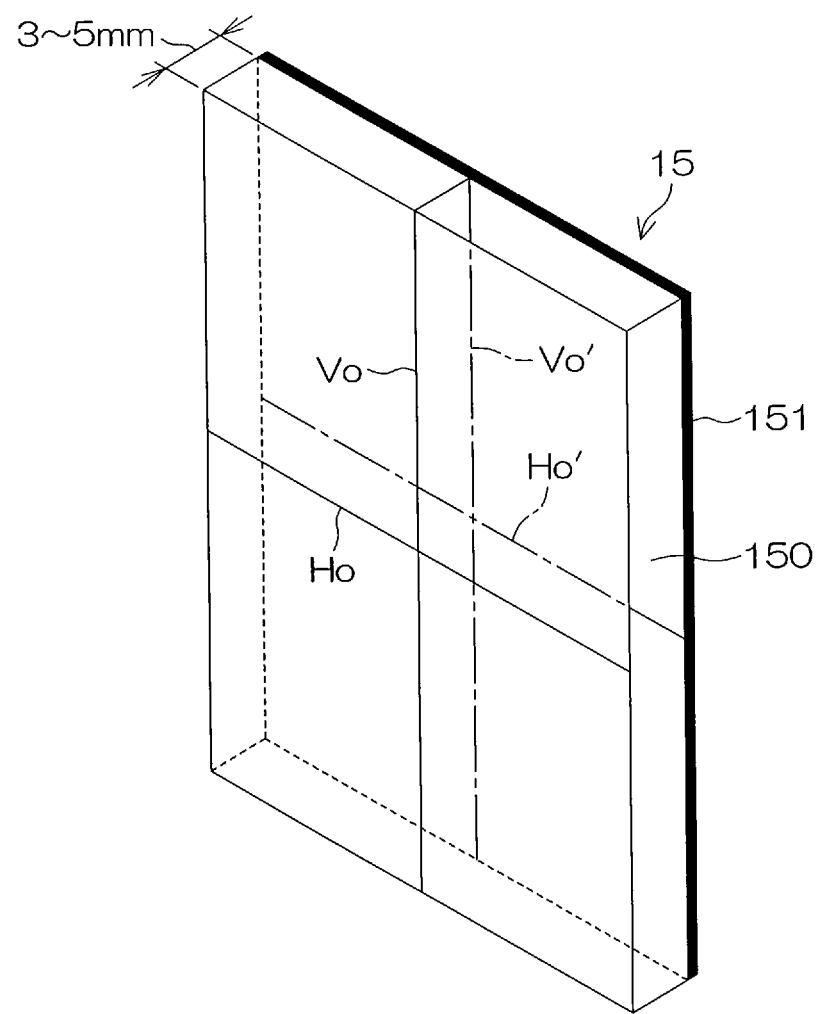
FIG. 16 is a perspective view showing an arrangement example of a one-way mirror 15 used in the head positioning standardization apparatus according to each preferred embodiment of the present invention.

FIG. 16 is a perspective view showing an arrangement example of the one-way mirror 15 (see FIGS. 1, 3, 8, 9, 10, 14, and 15) used in the head positioning standardization apparatus according to each preferred embodiment of the present invention.

The one-way mirror 15 may be formed of a transparent glass plate 150 that has, for example, a vertically long rectangular shape in frontal view and is 3 mm to 5 mm in thickness. For example, a silver plating layer 151 is thinly applied to a back of the glass plate 150. Also, a front horizontal reference line $H_0$ extending horizontally at a central portion in the up/down direction and a front vertical reference line $V_0$ extending vertically at a central portion in the right/left direction are indicated on a frontal side surface of the glass plate 150. Further, a rear horizontal reference line $H_0'$ extending horizontally at the central portion in the up/down direction and a rear vertical reference line $V_0'$ extending vertically at the central portion in the right/left direction are indicated on a back side surface of the glass plate 150.

With the one-way mirror 15, if, as one example, a reflectance is 50%, light made incident from the frontal side enters into an interior of the glass plate 150 from a front of the glass plate 150 and, for example, 50% is reflected by the silver plating layer 151 applied to the back of the glass plate 150 and is emitted from the frontal side upon passing through the interior of the glass plate 150. Also, for example, 50% of the light entering into the interior of the glass plate 150 is not reflected by the silver plating layer 151 applied to the back of the glass plate 150 but is transmitted through the silver plating layer 151 and emitted from the back side.

With the one-way mirror 15, the front horizontal reference line $H_0$ and the front vertical reference line $V_0$ indicated on the frontal side surface of the glass plate 150 and the rear horizontal reference line $H_0'$ and the rear vertical reference line $V_0'$ indicated on the back side surface of the glass plate 150 are designed such that when viewed in a state of facing the one-way mirror 15 squarely, $H_0$ and $H_0'$ overlap completely and $V_0$ and $V_0'$ overlap completely such as to appear as a single horizontal reference line H and a single vertical reference line (median line) V.

The patient faces the one-way mirror 15 with the median (vertical reference) line and the horizontal reference line for the face drawn thereon and can position the frontal orientation to one's own satisfaction and the operator can check the right/left facial symmetry of the patient facing the one-way mirror 15 from the fixed viewpoint direction of the camera that is disposed based on the median (vertical reference) line at the height of the horizontal reference line, guide the patient's head position from anatomical and clinical standpoints, and position the frontal orientation to that which is ultimately satisfying to both the patient and the operator while checking with the patient. Then, from the positional relationship of the reference planes and the camera images of the straight-going frontal and lateral maxillofacial portions taken from the fixed viewpoint directions based on the reference planes, the same head position can be positioned and reproduced repeatedly.

The one-way mirror 15 of this preferred embodiment can increase the precision of the head position orientation of the patient who faces the one-way mirror 15 at the frontal head position.

When, as shown in FIG. 17(A), the patient faces the one-way mirror 15 squarely at the correct position with respect to the horizontal reference lines $H_0$ and $H_0'$, the horizontal reference lines $H_0$ and $H_0'$ overlap and appear as a single line. However, if the viewpoint of the patient is deviated upward or downward, the horizontal reference lines $H_0$ and $H_0'$ appear as two lines (in double).

Also, as shown in FIG. 17(B), when the patient faces the one-way mirror 15 squarely at the correct position with respect to the vertical reference lines $V_0$ and $V_0'$, the vertical reference lines $V_0$ and $V_0'$ overlap and appear as a single line. However, if the viewpoint of the patient is deviated to the right or left, the vertical reference lines $V_0$ and $V_0'$ appear as two lines (in double).

In regard to the viewpoint direction at the operator side, the viewpoint direction can be set stereoscopically by the cameras, from the orthogonal directions from the frontal side and the lateral side, and by the horizontal and vertical reference lines to position the patient's head position. On the other hand, the patient side can only check from the position and direction of the frontal side appearing on the one-way mirror 15, it can be said that control of the orientation as viewed from the lateral side is insufficient.

Thus, by adjusting the height and the orientation of the face to an orientation in which the indicated horizontal lines do not appear in double, the patient can also position the head position orientation from the lateral direction more accurately. The operator can also adjust the height of the one-way mirror 15 with the camera provided on the horizontal reference plane such that the patient takes on a normal posture and head position at the height at which the horizontal reference lines does not appear in double and, by having the frontal side be set according to height, can reproduce the same frontal orientation more accurately and in a short time in subsequent sessions.

Also, by similarly indicating the vertical reference lines (median lines) stereoscopically, the orientation and position in the right/left direction of the face can be positioned and reproduced in accordance with how the lines appear.

The present invention is not restricted to the preferred embodiments described above and various modifications can be made within the scope of matters described in the claims.

The present application corresponds to Japanese Patent Application No. 2020-151642 filed on Sep. 9, 2020 in the Japan Patent Office, and the entire disclosure of this application is incorporated herein by reference.

REFERENCE SIGNS LIST 1 cephalometric radiography apparatus
2, 35 X-ray irradiating portion
3, 36 X-ray detecting portion
5, 14, 24, 31, 40 support column
6 base
7 feet position indication
8, 81, 82 arm
11 first digital camera
12 second digital camera
13 first monitor
15 one-way mirror
16 second monitor
21 third digital camera
22 fourth digital camera
23 fifth digital camera
25 auxiliary arm
26 auxiliary support column
27 third monitor
28 fourth monitor
29 fifth monitor
30 head CT image-taking apparatus
32 support frame
33 support shaft
34 rotating arm
35 X-ray irradiating portion
36 X-ray detecting portion
37, 38 leg portion
39 mounting plate
150 glass plate
151 silver plating layer

The invention claimed is:

1. A head positioning standardization method for cephalometric radiography comprising:
 a lateral positioning step of using a first digital camera to perform imaging of a lateral side of a head of a patient and displaying a lateral head image of the patient together with a first horizontal reference line and a first vertical reference line on a first monitor, wherein the first digital camera has a horizontal camera optical axis positioned coincident with an X-ray radiography axis for image taking, from a lateral side, the head of a patient disposed in an image-taking space, and wherein the first horizontal reference line and the first vertical reference line are determined by the camera optical axis of the first digital camera; and
 a frontal positioning step of using a second digital camera to perform imaging of a facial side of the head of the patient and displaying a facial head image of the patient together with a second horizontal reference line and a second vertical reference line on a second monitor, wherein the second digital camera has a horizontal camera optical axis forming an angle of 90° with the camera optical axis of the first digital camera and directed toward a facial side of the head of the patient disposed in the image-taking space, and wherein the second horizontal reference line and the second vertical reference line are determined by the camera optical axis of the second digital camera, wherein, in the lateral positioning step, while viewing the display on the first monitor, an up/down position of the first digital camera is adjusted and the patient is instructed to adjust a front/rear position of the head such that an intersection of the first horizontal reference line and the first vertical reference line that corresponds to the camera optical axis of the first digital camera is set at an external auditory canal center of the patient, the frontal positioning step comprises imaging the facial side of the head of the patient via a one-way mirror disposed in front of the second digital camera, the one-way mirror has a front horizontal reference line $H_0$ and a front vertical reference line $V_0$ indicated on a front surface opposing the patient, the second digital camera and the one-way mirror are positioned such that the second horizontal reference line and the front horizontal reference line $H_0$ overlap as a single horizontal reference line and the second vertical reference line and the front vertical reference line $V_0$ overlap as a single vertical reference line, and in the frontal positioning step, while viewing the display on the second monitor, up/down positions of the second digital camera and the one-way mirror are adjusted and the patient is instructed to adjust a tilt in an up/down direction and a right/left direction of the facial side of the head to equalize heights of the right and left eyes such that the second horizontal reference line passes through centers of the right and left eyeballs and the patient is also instructed to adjust an orientation in the right/left direction of the facial side of the head such that the front vertical reference line $V_0$ indicated on the one-way mirror passes through a middle between the right and left eyes of the patient, and wherein the method further comprises a recording step comprising recording a lateral head image in association with the first horizontal reference line and the first vertical reference line, recording a facial head image in association with the second horizontal reference line and the second vertical reference line, and recording height positions of the first digital camera and the second digital camera.

2. The head positioning standardization method according to claim 1, wherein the first digital camera includes at least a pair of digital cameras which are positioned in parallel with an X-ray radiography axis for image taking.

3. The head positioning standardization method according to claim 1, further comprising:

performing a subsequent head positioning standardization on the patient, wherein in a subsequent lateral positioning step,
  a height of the first digital camera is set at the height position recorded for the first digital camera in the previous recording step,
  a lateral head image of the patient imaged with the first digital camera, the first horizontal reference line, and the first vertical reference line are displayed on the first monitor, and the previously recorded lateral head image, first horizontal reference line, and first vertical reference line are displayed overlappingly on the display on the first monitor, and
  the patient is instructed to adjust the front/rear position of the head such that the intersection of the first horizontal reference line and the first vertical reference line that corresponds to the camera optical axis of the first digital camera is set at the external auditory canal center of the patient and overlapping of contours is achieved with respect to the previously recorded lateral head image and, in a subsequent frontal positioning step,
  a height of the second digital camera is set at the height position recorded for the second digital camera in the previous recording step,
  a facial head image of the patient imaged with the second digital camera, the second horizontal reference line, and the second vertical reference line are displayed on the second monitor, and the previously recorded facial head image, second horizontal reference line, and second vertical reference line are displayed overlappingly on the display on the second monitor, and
  the patient is instructed to equalize heights of the right and left eyes and adjust orientation in the right/left direction of the facial side of the head such that overlapping of contours is achieved with respect to the previously recorded facial head image.

4. A cephalometric radiography method comprising:

performing the head positioning standardization method for cephalometric radiography according to claim 1;

withdrawing the first digital camera from being coincident with the X-ray radiography axis after the recording step; and performing X-ray irradiation.

5. The head positioning standardization method according to claim 3, wherein, in the subsequent frontal positioning step, the patient adjusts a tilt in up/down direction and a right/left direction of the facial side of the head with respect to the front horizontal reference line $H_0$ and the front vertical reference line $V_0$ indicated on the one-way mirror.

6. The head positioning standardization method according to claim 5, wherein the subsequent head positioning standardization further comprises:

a subsequent recording step comprising recording a lateral head image in association with the first horizontal reference line and the first vertical reference line, recording a facial head image in association with the second horizontal reference line and the second vertical reference line, and recording height positions of the first digital camera and the second digital camera.

7. A head positioning standardization method for head X-ray CT comprising;

a lateral positioning step of using a first digital camera to perform imaging of a lateral side of a head of a patient and displaying a lateral head image of the patient together with a first horizontal reference line and a first vertical reference line on a first monitor, wherein the first digital camera has a horizontal camera optical axis directed toward a lateral side of the head of a patient disposed in an image-taking space, and wherein the first horizontal reference line and the first vertical reference line are determined by the camera optical axis of the first digital camera; and a frontal positioning step of using a second digital camera to perform imaging of a facial side of the head of the patient and displaying a facial head image of the patient together with a second horizontal reference line and a second vertical reference line on a second monitor, wherein the second digital camera has a horizontal camera optical axis forming an angle of 90° with the camera optical axis of the first digital camera and directed toward a facial side of the head of the patient disposed in the image-taking space, and wherein the second horizontal reference line and the second vertical reference line are determined by the camera optical axis of the second camera, wherein, in the lateral positioning step, while viewing the display on the first monitor, an up/down position of the first digital camera is adjusted and the patient is instructed to adjust a front/rear position of the head such that an intersection of the first horizontal reference line and the first vertical reference line that corresponds to the camera optical axis of the first digital camera is set at an external auditory canal center of the patient, the frontal positioning step comprises imaging the facial side of the head of the patient via a one-way mirror disposed in front of the second digital camera, the one-way mirror has a front horizontal reference line $H_0$ and a front vertical reference line $V_0$ indicated on a front surface opposing the patient, the second digital camera and the one-way mirror are positioned such that the second horizontal reference line and the front horizontal reference line $H_0$ overlap as a single horizontal reference line and the second vertical reference line and the front vertical reference line $V_0$ overlap as a single vertical reference line, and in the frontal positioning step, while viewing the display on the second monitor, up/down positions of the second digital camera and the one-way mirror are adjusted and the patient is instructed to adjust a tilt in a up/down direction and a right/left direction of the facial side of the head to equalize heights of the right and left eyes such that the second horizontal reference line passes through centers of the right and left eyeballs and the patient is also instructed to adjust an orientation in the right/left direction of the facial side of the head such that the front vertical reference line $V_0$ indicated on the one-way mirror passes through a middle between the right and left eyes of the patient, and wherein the method further comprises a recording step comprising recording a lateral head image in association with the first horizontal reference line and the first vertical reference line, recording a facial head image in association with the second horizontal reference line and the second vertical reference line, and recording height positions of the first digital camera and the second digital camera.

8. The head positioning standardization method according to claim 7, further comprising:

performing a subsequent head positioning standardization on the patient, wherein in a subsequent lateral positioning step, a height of the first digital camera is set at the height position recorded for the first digital camera in the previous recording step, a lateral head image of the patient imaged with the first digital camera, the first horizontal reference line, and the first vertical reference line are displayed on the first monitor, and the previously recorded lateral head image, first horizontal reference line, and first vertical reference line are displayed overlappingly on the display on the first monitor, and the patient is instructed to adjust the front/rear position of the head such that the intersection of the first horizontal reference line and the first vertical reference line that corresponds to the camera optical axis of the first digital camera is set at the external auditory canal center of the patient and overlapping of contours is achieved with respect to the previously recorded lateral head image and, in a subsequent frontal positioning step, a height of the second digital camera is set at the height position recorded for the second digital camera in the previous recording step, a facial head image of the patient imaged with the second digital camera, the second horizontal reference line, and the second vertical reference line are displayed on the second monitor, and the previously recorded facial head image, second horizontal reference line, and second vertical reference line are displayed overlappingly on the display on the second monitor, and the patient is instructed to equalize heights of the right and left eyes and adjust orientation in the right/left direction of the facial side of the head such that overlapping of contours is achieved with respect to the previously recorded facial head image.

9. The head positioning standardization method according to claim 8, wherein, in the subsequent frontal positioning step, the patient adjusts a tilt in up/down direction and a right/left direction of the facial side of the head with respect to the front horizontal reference line $H_0$ and the front vertical reference line $V_0$ indicated on the one-way mirror.

10. The head positioning standardization method according to claim 9, wherein the subsequent head positioning standardization further comprises:

a subsequent recording step comprising recording a lateral head image in association with the first horizontal reference line and the first vertical reference line, recording a facial head image in association with the second horizontal reference line and the second vertical reference line, and recording height positions of the first digital camera and the second digital camera.

* * * * *